(12) United States Patent
Bromwich et al.

(10) Patent No.: US 12,141,717 B2
(45) Date of Patent: Nov. 12, 2024

(54) SYSTEMS AND METHODS FOR MANAGING ELECTRICALLY-ASSISTED PERSONAL MOBILITY VEHICLES

(71) Applicant: Lyft, Inc., San Francisco, CA (US)

(72) Inventors: David Keith Bromwich, Brooklyn, NY (US); Jules Baden Flynn, New York City, NY (US); Daniel Fried, Brooklyn, NY (US); Emily Kathleen Gates, Brooklyn, NY (US); Alexander Reed Hill, Brooklyn, NY (US); John Mokry, Brooklyn, NY (US); Josselin Philippe, Far Rockaway, NY (US)

(73) Assignee: Lyft, Inc., San Francisco, CA (US)

( * ) Notice: Subject to any disclaimer, the term of this patent is extended or adjusted under 35 U.S.C. 154(b) by 544 days.

(21) Appl. No.: 17/026,028

(22) Filed: Sep. 18, 2020

(65) Prior Publication Data
US 2021/0027214 A1   Jan. 28, 2021

Related U.S. Application Data

(63) Continuation-in-part of application No. 16/391,294, filed on Apr. 22, 2019, now Pat. No. 10,783,500.

(51) Int. Cl.
*G06Q 10/02* (2012.01)
*B60L 58/10* (2019.01)
(Continued)

(52) U.S. Cl.
CPC .............. *G06Q 10/02* (2013.01); *B60L 58/10* (2019.02); *G06Q 10/20* (2013.01); *H04W 4/029* (2018.02); *H04W 4/40* (2018.02); *H04W 48/02* (2013.01)

(58) Field of Classification Search
CPC ........ G06Q 10/02; G06Q 10/20; B60L 58/10; H04W 4/029; H04W 4/40
See application file for complete search history.

(56) References Cited

U.S. PATENT DOCUMENTS

2006/0089844 A1   4/2006   Dickinson
2006/0293835 A1  12/2006   Smith
(Continued)

OTHER PUBLICATIONS

Nikipedia, "Citi Bike", URL: hllps://en.wikipedia.org/wiki/Citi_Bike, Mar. 31, 2019, 14 pages.
(Continued)

*Primary Examiner* — Kira Nguyen
(74) *Attorney, Agent, or Firm* — Baker Botts L.L.P.

(57) ABSTRACT

The disclosed computer-implemented method may include identifying a personal mobility vehicle that is available to reserve for a trip, determining that at least one metric for a level of maintenance for the personal mobility vehicle indicates a need for performing the maintenance on the personal mobility vehicle, determining at least one metric for an operations effort for performing the maintenance at a current location of the personal mobility vehicle, and blocking use of the personal mobility vehicle, to facilitate the operations effort for the performing of the maintenance, based at least in part on the metric for the level of maintenance and at least in part on the metric for the operations effort indicating an advantage to performing the maintenance at the current location. Various other methods, systems, and computer-readable media are also disclosed.

20 Claims, 14 Drawing Sheets

(51) Int. Cl.
  *G06Q 10/20* (2023.01)
  *H04W 4/029* (2018.01)
  *H04W 4/40* (2018.01)
  *H04W 48/02* (2009.01)

(56) References Cited

U.S. PATENT DOCUMENTS

| | | | |
|---|---|---|---|
| 2014/0232340 A1 | 8/2014 | Jones | |
| 2014/0379174 A1* | 12/2014 | Holub | B60R 16/033 |
| | | | 701/2 |
| 2015/0088414 A1 | 3/2015 | Mason | |
| 2017/0039668 A1* | 2/2017 | Luke | G07C 5/008 |
| 2018/0046961 A1 | 2/2018 | Tulabandhula | |
| 2018/0189713 A1* | 7/2018 | Matthiesen | H04L 67/51 |
| 2018/0257473 A1* | 9/2018 | Follen | B60W 20/12 |
| 2018/0308191 A1 | 10/2018 | Matthiesen et al. | |
| 2018/0315146 A1 | 11/2018 | Matthiesen et al. | |
| 2018/0322775 A1* | 11/2018 | Chase | G06F 15/76 |
| 2019/0039731 A1 | 2/2019 | Marcath | |
| 2019/0232792 A1* | 8/2019 | Ahmed | B60L 53/66 |
| 2019/0248439 A1* | 8/2019 | Wang | B62K 11/10 |
| 2019/0272362 A1* | 9/2019 | Thorley | H04L 63/105 |
| 2019/0324446 A1* | 10/2019 | VanderZanden | G05D 1/0291 |

OTHER PUBLICATIONS

Hellotracks, "Hellotracks—Features", URL: https://www.hellotracks.com/features.html, as accessed on Apr. 23, 2019, 12 pages.
Motivate, "What we do", URL: hllps://www.motivateco.com/what-we-do/what-we-do/, as accessed on Apr. 23, 2019, 8 pages.

* cited by examiner

| Station Name 902 | Number of PMVs Blocked 904 | PMV ID 906 | Time Blocked 908 | Duration Since Block 910 | Duration Since Battery Swap 912 | Duration Since Maintenance 914 |
|---|---|---|---|---|---|---|
| 8th St at ABC St 916 | 4 918 | 12 920a | 9/10/2018 23:18UTC 922a | 0D14H42M 924a | | 360D02H14M 926a |
| | | 11 920b | 9/11/2018 09:07UTC 922b | 0D04H53M 924b | 1D04H10M 926b | |
| | | 13 920c | 9/11/2018 10:21UTC 922c | 0D03H39M 924c | 2D01H16M 926c | |
| | | 10 920d | 9/11/2018 11:12UTC 922d | 0D02H48M 924d | 7D02H00M 926d | |

SYSTEMS AND METHODS FOR MANAGING ELECTRICALLY- ASSISTED PERSONAL MOBILITY VEHICLES

CROSS REFERENCED TO RELATED APPLICATIONS

This application claims priority to and is a continuation of U.S. patent application Ser. No. 15/859,166, filed on Dec. 29, 2017, the contents of which are incorporated herein by reference in its entirety.

BACKGROUND

A dynamic transportation network that provides on-demand transportation to transportation requestors may include and use personal mobility vehicles for fulfilling transportation requests. A transportation requestor may meet up with the personal mobility vehicle and ride the personal mobility vehicle along a route from a starting location to an ending location (a destination). The dynamic transportation network, in order to provide a positive requestor experience, may need to ensure that a motor-assisted personal mobility vehicle has sufficient battery charge for use by the requestor when riding the personal mobility vehicle from the starting location to the ending location.

BRIEF DESCRIPTION OF THE DRAWINGS

The accompanying drawings illustrate a number of exemplary embodiments and are a part of the specification. Together with the following description, these drawings demonstrate and explain various principles of the present disclosure.

FIG. 9 is an illustration of an example table showing personal mobility vehicle information and battery status information for respective personal mobility vehicles.

Figure 1:
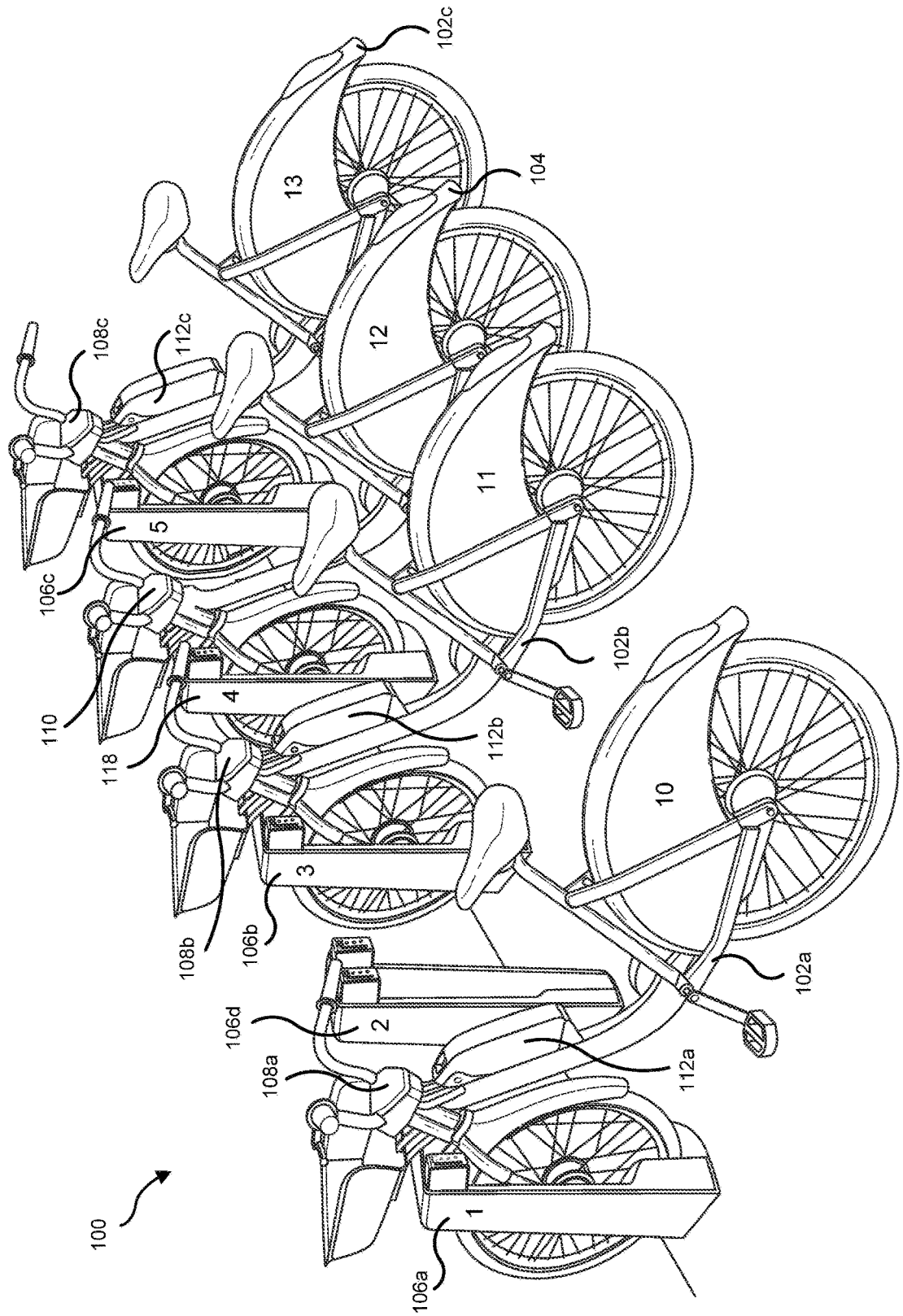
FIG. 1 is an illustration of an example station that includes docks, e-bikes, and a classic bike.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

The present disclosure is generally directed to efficient systems and methods for periodically blocking or taking an electrically-assisted personal mobility vehicle out of service for battery swapping to ensure that a battery of the electrically-assisted personal mobility vehicle is always adequately charged so that a transportation requestor may complete a trip using the electrically-assisted personal mobility vehicle. As will be explained in greater detail below, embodiments of the present disclosure may determine efficient conditions under which to swap a battery of an electrically-assisted personal mobility vehicle with a fully charged battery (or otherwise perform maintenance on the personal mobility vehicle) to improve the availability of maintained personal mobility vehicles and/or to reduce operations efforts expended on maintaining personal mobility vehicles.

Additionally, or alternatively, one or more efficient conditions may be based on a current location of the personal mobility vehicle as compared to known or potential future locations of the personal mobility vehicle. For example, systems described herein may block a personal mobility vehicle at a location when an operations effort to perform maintenance on the personal mobility vehicle at the location is lower than an expected operations effort if the personal mobility vehicle were to leave the location. In some examples, systems described herein may block a personal mobility vehicle with a relatively lower maintenance need (e.g., with a battery retaining a partial charge sufficient to support an additional use) based on a predicted advantage to an operations effort at the current location. In some implementations, a current location of a personal mobility vehicle may facilitate the operations effort for performing the maintenance by utilizing the availability of a technician at the location. In some implementations, a current location of a personal mobility vehicle may facilitate the operations effort for performing the maintenance based on a number of personal mobility vehicles also at the same location that may need maintenance. For example, a "honeypot" hub may include multiple personal mobility vehicles needing maintenance such that a technician sent to the location may be efficiently utilized.

In some implementations, a current location of a personal mobility vehicle may facilitate the operations effort for performing the maintenance based on a distance traveled to a personal mobility vehicle by a technician when performing maintenance. For example, if a personal mobility vehicle is located close to (near) a location of a technician and the technician is available, it may be more efficient to perform maintenance on the personal mobility vehicle when the technician is close to (near) the personal mobility vehicle than at a later time when a technician may need to be sent (dispatched) to another location of the personal mobility vehicle that is at a father distance from a location of a technician. For example, a personal mobility vehicle may be considered close to (near) a location of a technician if the personal mobility vehicle is located less than a specific distance from a location of a technician (e.g., one mile, five miles, ten miles).

In some implementations, a current location of a personal mobility vehicle may facilitate the operations effort for performing the maintenance based on an amount of travel time of the technician to the personal mobility vehicle. For example, a technician may not be considered close to (near) a location of the personal mobility vehicle but because it is not at a peak travel time (e.g., there is no traffic) and the technician is available to perform the maintenance (e.g., the technician has available time, the technician is qualified to perform the maintenance, the technician has any needed parts or components for performing the maintenance, etc.), it may make sense to block the personal mobility vehicle for maintenance at the location as the technician is available and can get to the personal mobility vehicle in a reasonable amount of time to perform the maintenance. For example, though a personal mobility vehicle may not located less than a specific distance from a location of a technician (e.g., one mile, five miles, ten miles) a travel time of the technician to the personal mobility vehicle may be favorable (e.g., less than five minutes, less than ten minutes, less than fifteen minutes, respectively).

In some implementations, a current location of a personal mobility vehicle may facilitate the operations effort for performing the maintenance based on time needed by technician to perform maintenance. For example, it may be more efficient for a technician skilled in one type of maintenance to perform that maintenance as compared to performing maintenance that they may not be as skilled in. Therefore, if a type of maintenance may be due on a personal mobility vehicle and a technician skilled in the type of maintenance is available and located close to the personal mobility vehicle, it may make sense to block use of the personal mobility vehicle for the performance of the maintenance.

As described in the implementations above, one or more efficient conditions may be based on a current location of the personal mobility vehicle as compared to known or potential future locations of the personal mobility vehicle because a technician may not be readily available to be dispatched (sent) to potential or known future locations of the personal mobility vehicle before the maintenance is needed (due) for the personal mobility vehicle. In another case, a potential or known future location of a personal mobility vehicle may be too far a distance from a location of a technician and/or may be too long a travel time from a location of a technician.

In some implementations, a dynamic transportation matching system may determine a future location of a personal mobility vehicle based on knowing a route for a trip for the personal mobility vehicle (e.g., a requestor entered a destination location when reserving the personal mobility vehicle). In some implementations, a dynamic transportation matching system may predict a future location of a personal mobility vehicle based on a requestor use history. For example, a requestor use history may indicate that a requestor reserving a personal mobility vehicle at a first location typically rides the personal mobility vehicle to a second, destination location. In some implementations, a dynamic transportation matching system may use statistical analysis to determine a potential future location of a personal mobility vehicle. For example, based on a starting location of a personal mobility vehicle for a trip, the dynamic transportation matching system may determine that most requestors when starting a trip at a first location of a personal mobility vehicle ride the personal mobility vehicle to a second, destination location.

As described herein, an electrically-assisted personal mobility vehicle may include, but is not limited to, an electric bicycle (or "e-bike") and an electric scooter (or "e-scooter"). An electric scooter may be electrically powered wholly or partly. In some examples, an electrically-assisted scooter may include a built-in battery-powered motor that may be used to assist a rider of the scooter. An electric bicycle may be electrically powered wholly or partly. In some examples, an electrically-assisted bicycle may include a built-in battery powered motor that may be used to assist the pedal power of a rider. A classic bicycle (a classic bike), as referred to herein, may be a pedal-powered only bicycle.

Though described with reference to an electrically-assisted personal mobility vehicle, the systems and methods described herein may also be used to determine the most efficient ways to perform maintenance on personal mobility vehicles in general to optimize an operations effort for the personal mobility vehicle.

Though described with reference to electrically-assisted personal mobility vehicles, the systems and methods described herein may also be used to determine the most efficient ways to perform maintenance on other types of battery operated or battery-assisted vehicles that may include a battery in general to optimize an operations effort for the vehicle. These other types of vehicles may be referred to as battery electric vehicles and may include, but are not limited to, automobiles, trucks, buses, skateboards, watercraft, and motorcycles (e.g., standard, cruisers, sport bikes, dirt bikes, touring, sport touring, dual sport, mopeds, and off-road).

A dynamic transportation matching system may determine when to block an electrically-assisted personal mobility vehicle, the blocking of the electrically-assisted personal mobility vehicle removing the electrically-assisted personal mobility vehicle from service for an amount of time (e.g., until an unblocking event occurs, such as maintenance being performed on the personal mobility vehicle). Removing the electrically-assisted personal mobility vehicle from service may result in the electrically-assisted personal mobility vehicle being unavailable for reserving by a transportation requestor (also referred to herein as a requestor).

In some implementations, the dynamic transportation matching system may determine to block the electrically-assisted personal mobility vehicle at a location and time that improves the efficiency of maintenance operations (e.g., operation teams and/or robots traveling to retrieve and/or perform maintenance on personal mobility vehicles), that improves the availability and distribution of maintained (e.g., charged) personal mobility vehicles, and/or that reduces the amount of time that the electrically-assisted personal mobility vehicle is blocked or removed from service awaiting a battery swap. In some examples, an electrically-assisted personal mobility vehicle station may be identified as the location for performing battery swaps by a technician. An electrically-assisted personal mobility vehicle station may be a location that includes multiple electrically-assisted personal mobility vehicles in individual docks (e.g., scooter parking spaces, bicycle parking spaces). Each dock may provide a parking location for an electrically-assisted personal mobility vehicle and a dispenser that allows a requestor to reserve the electrically-assisted personal mobility vehicle for a trip. Blocking the use of an electrically-assisted personal mobility vehicle (removing the electrically-assisted personal mobility vehicle from service) may result in a requestor not be able to reserve the electrically-assisted personal mobility vehicle (e.g., the electrically-assisted personal mobility vehicle may be locked to its dock, the dispenser may be disabled, etc.).

A dynamic transportation matching system may use one or more criteria to determine where and when to block an electrically-assisted personal mobility vehicle for battery swapping. The criteria may include (i) limiting the number of stations where battery swaps may be performed based on, for example, technician convenience (e.g., establishing "no swap" zones), (ii) determining a battery threshold value that if met will block the electrically-assisted personal mobility vehicle, (iii) identifying "honeypot" hubs (e.g., one or more stations) that include multiple (more than one) blocked bike, and (iv) determining an amount of time (e.g., a number of days) since a last battery swap. In some implementations, the dynamic transportation matching system may dynamically determine a battery threshold level based on one or more of a location of an electrically-assisted personal mobility vehicle station (e.g., an identified honeypot hub verses a no swap zone), a ratio of electrically-assisted personal mobility vehicles to classic bikes available at a station, a time of day, a day of the week, the weather, if a nearby event is occurring, an upcoming anticipated customer demand, etc.

A honeypot hub may be identified based on a number of electrically-assisted personal mobility vehicles blocked at the station. For example, using a dynamic battery threshold level, once one bike is blocked at a station the battery threshold level may be modified to block additional bikes at the station based on a technician being at the station to perform battery swapping. A computing system included in a dock at the station may receive broadcasted battery and electrically-assisted personal mobility vehicle information via a Bluetooth connection between the electrically-assisted personal mobility vehicle parked at the dock and the computing system. The dock computing system may provide the dynamic transportation matching system with the information. The dynamic transportation matching system may use the information to update an estimated remaining battery life value stored in a database accessible by the dynamic transportation matching system. In addition, or in the alternative, when an electrically-assisted personal mobility vehicle is docked/undocked in a dock at the station, a trip minutes for the last trip for the electrically-assisted personal mobility vehicle may be calculated and used to update the stored estimated remaining battery life value in the database. The stored estimated battery life value may be compared to the battery threshold level to determine whether an electrically-assisted personal mobility vehicle should be blocked for a battery swap. A key inserted into a dock (a docking position) for the electrically-assisted personal mobility vehicle may be customized per role type. For example, when a rider inserts a rider key, this may indicate an undocking event and the reserving of the electrically-assisted personal mobility vehicle by the rider. When a technician inserts a technician key this may indicate that the battery is being swapped on the electrically-assisted personal mobility vehicle.

The systems and methods described herein for blocking a personal mobility vehicle for a battery swap may also be used to block a personal mobility vehicle for charging (recharging) of a battery included (mounted) on a personal mobility vehicle. For example, a personal mobility vehicle may be blocked for use when a battery charge level is below a threshold value. As described herein, a technician may be dispatched to the personal mobility vehicle to perform maintenance which may include charging the battery included (mounted) on the personal mobility vehicle. In some implementations, the battery may continue to be charged until the battery level of the battery is above the threshold value, unblocking the use of the personal mobility vehicle and making the personal mobility vehicle available for use by a requestor. In some implementations, the battery may continue to be charged until the battery level of the battery indicates that the battery is fully charged. Once the battery is fully charged, the use of the personal mobility vehicle may be unblocked, making the personal mobility vehicle available for use by a requestor. In some implementations, the battery may continue to be charged until the battery level of the battery is above another threshold value that is greater than the threshold value used to determine that the personal mobility vehicle be blocked for use but less than the threshold value for a fully charged battery, unblocking the use of the personal mobility vehicle and making the personal mobility vehicle available for use by a requestor. Though described herein with respect to the use of e-bikes, the systems and methods described herein may also be related to the use of any type of electrically-assisted personal mobility vehicle such as, for example, an e-scooter.

FIG. 1 is an illustration of an example station 100 that includes docks 106a-d, a dock 118, e-bikes 102a-c, and a classic bike 104. Each e-bike 102a-c may be parked and locked in a respective dock 106a-c. The classic bike 104 may be locked in the dock 118. Dock 106d may be empty. When locked in a dock, a bike may be used by a transportation requestor if the bike is considered available for a trip and if the requestor may reserve and have the ability to access the bike, unlocking it from the dock. The availability of a bike for use by a requestor and the mechanism for reserving and accessing the bike by the requestor will be described further herein.

The station 100 may be located at a location in an area where there is sufficient space for parking bicycles that may be easily accessible by requestors. In some implementations, a station may include a central kiosk that may provide additional services related to the maintaining, reserving, and usage of the bicycles. In some implementations, a station may include a valet that may assist in the parking, locking, reserving, and unlocking of the bicycles for use by a requestor. In some implementations, a requestor may run a software application on a computing device of the requestor that may include a user interface that provides one or more locations of stations that include personal mobility vehicles. The application may also provide, in real-time, the types and number of available personal mobility vehicles at each station.

As shown in FIG. 1, each dock 106a-c and the dock 118 may include an identifier (e.g., a number, a bar code, an RFID tag, etc.) that may be used to identify the dock. It is to be noted that any type of bike (e.g., an e-bike, a classic bike) may be parked in any available dock. As shown in FIG. 1, each bike (e.g., e-bikes 102a-c and classic bike 104) may include an identifier (e.g., a number, a bar code, an RFID tag, etc.) that may be used to identify the bike.

Each bike (e-bikes 102a-c and classic bike 104) may include a respective computing device (e-bike computing device 108a-c and classic bike computing device 110). In some implementations, the e-bike computing devices 108a-c and the classic bike computing device 110 may be the same (or similar) types of computing devices. In some implementations, each e-bike computing device 108a-c may be the same type of computing device different from the classic bike computing device 110.

In addition, the station 100 may include one or more scooters or other types of personal mobility vehicles. In some cases, the one or more scooters or other types of personal mobility vehicles may not be parked in a dock but may be located at the station 100. In some cases, the one or more scooters or other types of personal mobility vehicles may be parked in a dock at the station 100.

The e-bikes 102a-c may include respective battery packs 112a-c. The battery packs 112a-c may be activated to enable electrical pedal-assistance for the e-bikes 102a-c. It is to be noted that the e-bikes 102a-c may be operated without pedal-assistance if a battery pack of an e-bike does not have enough charge available to provide the electric pedal-assistance. In these cases, an e-bike may be operated by a requestor without the electrical pedal-assistance enabled, making the e-bike available for use by a requestor in the same manner as a classic bike.

Figure 2:
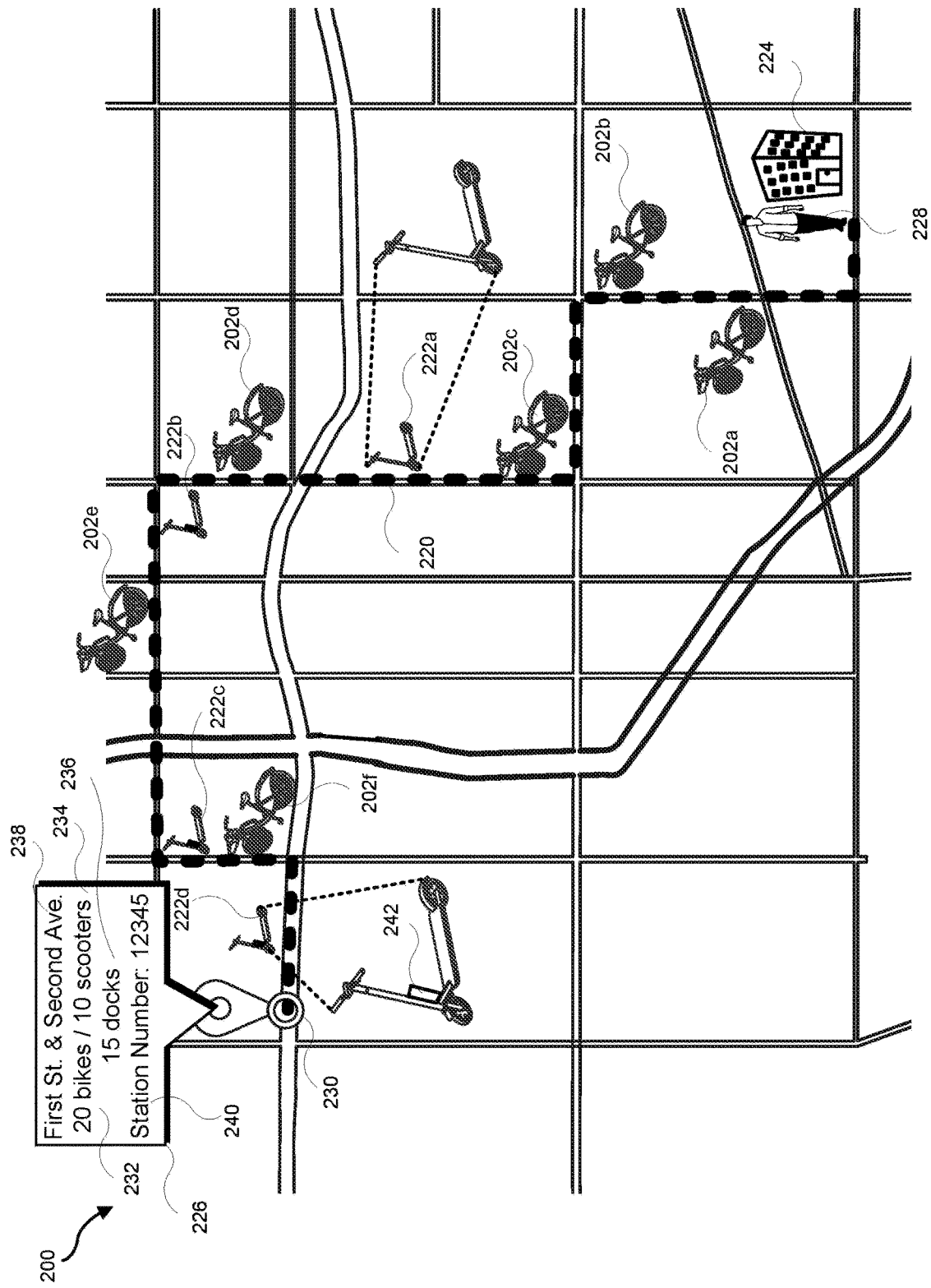
FIG. 2 is an illustration showing a map of bikes and scooters located along a route from a starting location to a station.

FIG. 2 is an illustration showing a map 200 of bikes 202a-f and scooters 222a-d located along a route 220 from a starting location 224 to a station 230. The bikes 202a-f may be e-bikes and/or classic bikes. The scooters 222a-d may include one or more e-scooters (e.g., e-scooter 222d that includes a battery pack 242) and/or one or more classic scooters (e.g., classic scooter 222a that does not include a battery pack). For example, the station 230 may be similar to the station 100 as shown in FIG. 1. In some implementations, a technician 228 may view the map 200 on a display device included on a computing device of the technician. A status indicator 226 may show information for the station 230 at a point in time. For example, the technician 228 may interact with the map 200 displayed on the display device and select the station 230, which will enable the status indicator 226 to pop-up on the map 200 and include a current status of the station 230 in the status indicator 226. As shown in the example of FIG. 2, the status indicator 226 shows a number of bikes 232 (e.g., the bikes may be e-bikes and/or classic bikes (as shown for example in FIG. 1)), a number of scooters 234 (e.g., the scooters may be e-scooters and/or classic scooters), and a number of docks 236 included at the station 230. The status indicator 226 may include a station street address 238 and a station number 240.

In some implementations, one or more bikes (e-bikes and/or classic bikes) may be located at the station 230 but may not be parked in a dock. For example, if a station has no available open docks, a bike (an e-bike and/or a classic bike) may be locked (not able to be ridden until reserved) and left at the station without parking the bike in a dock. In some cases, a bike (an e-bike and/or a classic bike) may be locked (not able to be ridden until reserved) and not located at a station. A locked bike may be parked at an arbitrary location outside of the station 230. In some cases, for example as shown in FIG. 2, the bikes 202a-f and the scooters 222a-d may be located between the location 224 of the technician 228 and the station 230. In some implementations, the technician 228, if dispatched to the station 230 for maintenance on bikes and/or scooters located at the station 230, may pick up the bikes 202a-f and/or the scooters 222a-d as the technician 228 travels from the starting location 224 to the station 230. One at the station 230, the technician 228 may perform the maintenance on the bikes and/or scooters already at the station 230 as well as the bikes 202a-f and/or the scooters 222a-d transported to the station 230 by the technician 228. In some implementations, the technician 228 may perform maintenance on the bikes 202a-f and/or the scooters 222a-d as the technician 228 travels the route 220. In these implementations, the bikes 202a-f and/or the scooters 222a-d may remain at their respective locations along the route 220.

In cases where a personal mobility vehicle is located in a dock at a station (e.g., e-bikes 102a-c parked and locked in the respective docks 106a-c, the classic bike 104 locked and parked in the dock 118), a computing device included in the dock may communicate with the personal mobility vehicle and may communicate with a remote computing system (e.g., a dynamic transportation matching system as described herein). In cases where a personal mobility vehicle is not located in a dock, the personal mobility vehicle may communicate with the computing system (e.g., the dynamic transportation matching system as described herein). The communication interfaces will be described further herein with reference to FIG. 7.

In some implementations, personal mobility vehicles may be located or distributed throughout an urban area where there are no stations and no docks. In these cases, the personal mobility vehicles (considered dockless personal mobility vehicles) may require needed maintenance and may be blocked for use. In these implementations, the dynamic transportation matching system 704 may determine when to block the use of a personal mobility vehicle for maintenance based a location of the dockless personal mobility vehicle. For example, a personal mobility vehicle may be located along a route of travel of a service technician at a particular time. In another example, a personal mobility vehicle may be at a location that a technician can easily and/or conveniently reach (e.g., in a parking lot, right off a main road, along a sidewalk, etc.). In these examples, the performance of the maintenance on the personal mobility vehicle at a time when a technician is conveniently located near the personal mobility vehicle may improve the availability of the maintained personal mobility vehicle while reducing an operations effort expended on maintaining the personal mobility vehicle. In another example, many personal mobility vehicles (a group of personal mobility vehicles) may be located together at one location (e.g., a parking lot, an area near a building or venue, etc.). In this example, dispatching a technician to the location of the group of personal mobility vehicles in order to perform maintenance on one or more of the personal mobility vehicles may also improve the availability of the maintained personal mobility vehicle while reducing an operations effort expended on maintaining the personal mobility vehicle.

Figure 3:
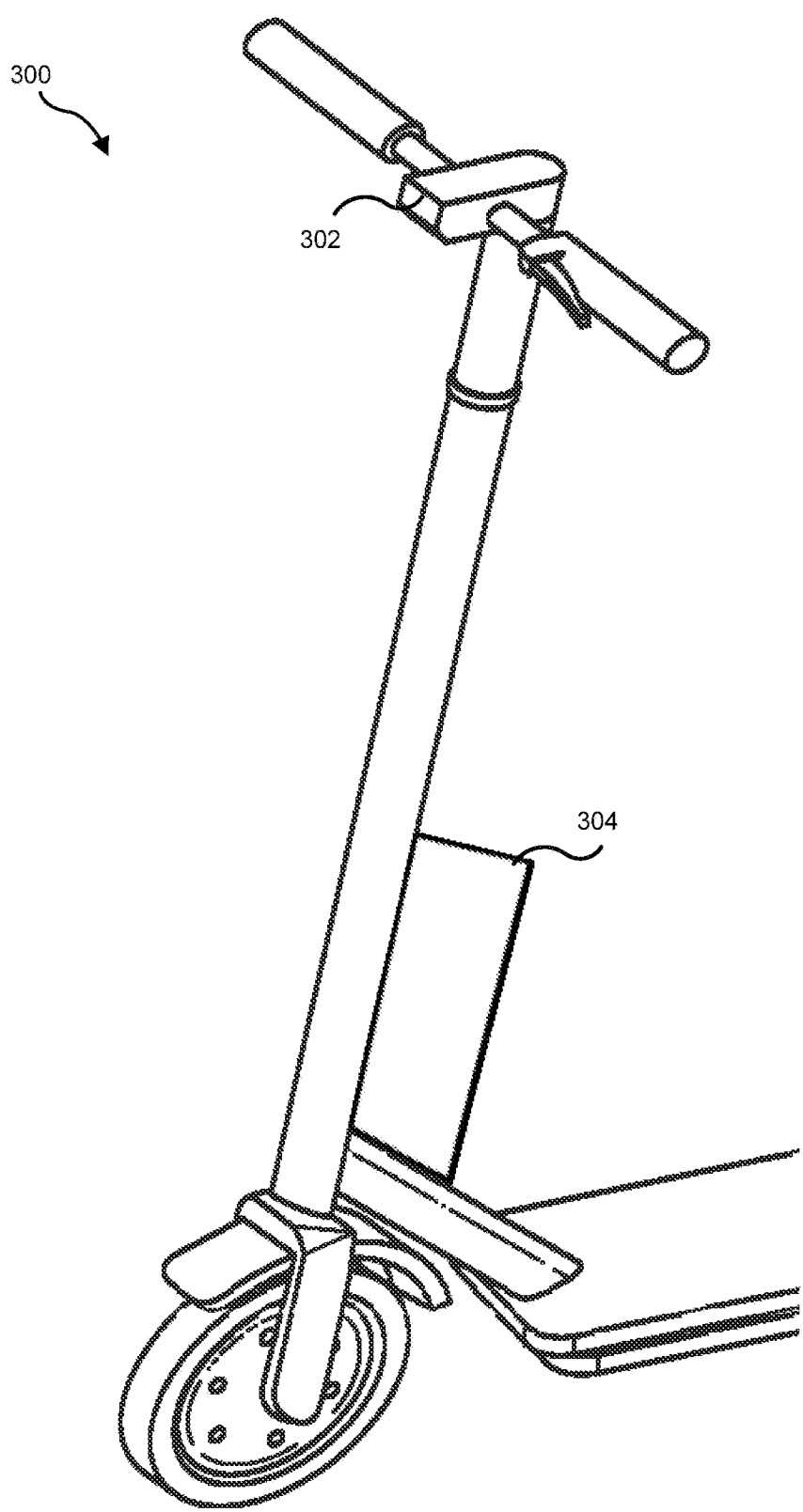
FIG. 3 is an illustration of an example e-scooter that includes a scooter computing device and a scooter battery pack.

FIG. 3 is an illustration of an example e-scooter 300 that includes a scooter computing device 302 and a scooter battery pack 304. A classic scooter may include the scooter computing device 302 and may not include the scooter battery pack 304. In some implementations, the scooter computing device 302 may communicate with a computing device in a dock. In some implementations, the scooter computing device 302 may communicate with a remote server (e.g., a dynamic transportation matching system). In some implementations, the scooter battery pack 304 may communicate with the scooter computing device 302. The scooter computing device 302 and/or the scooter battery pack 304 may be mounted on any location on the e-scooter 300.

Figure 4:
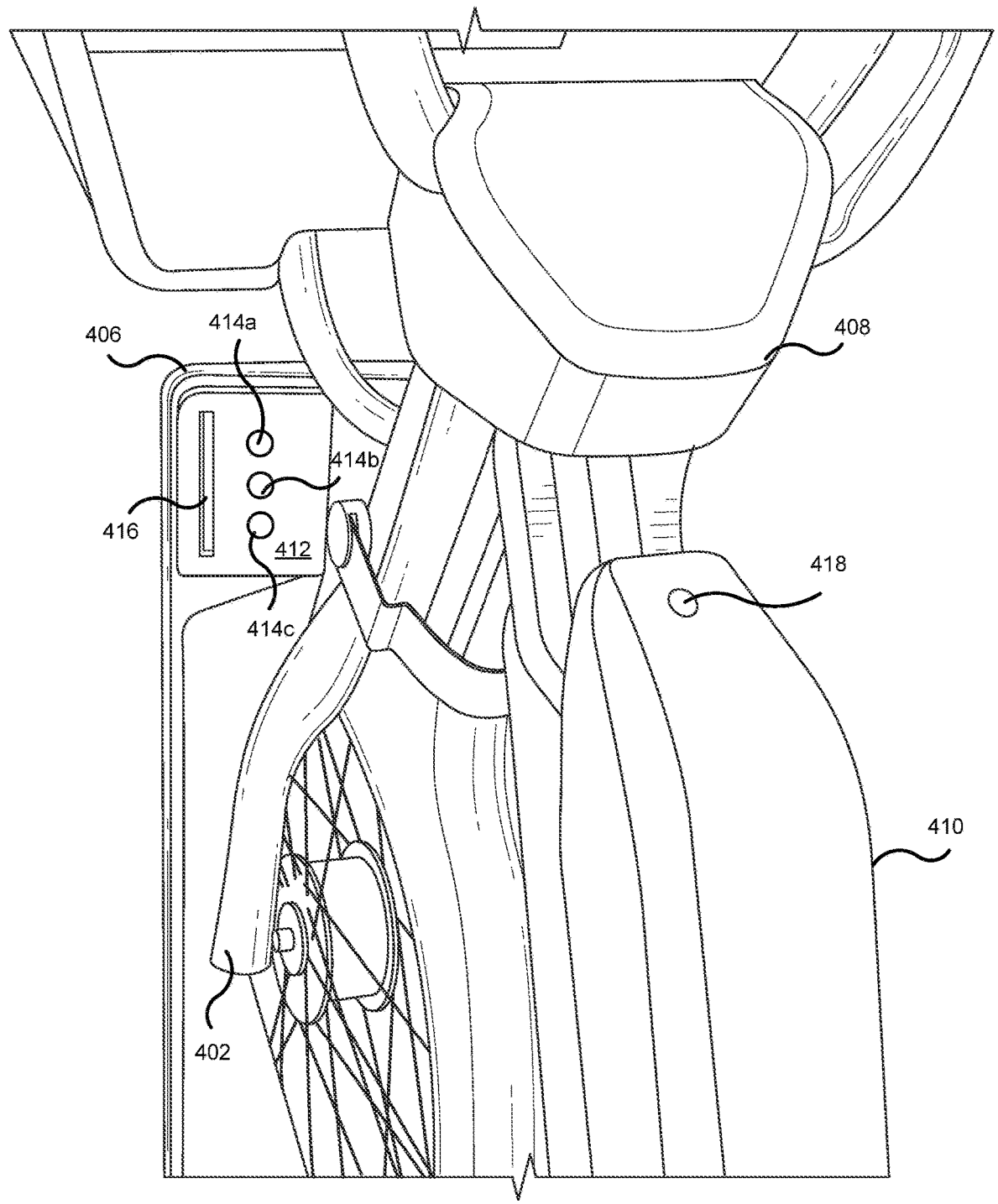
FIG. 4 is an illustration of an example e-bike when parked/locked in a dock.

FIG. 4 is an illustration of an example e-bike 402 when parked/locked in a dock 406. For example, referring to FIG. 1, the e-bike 402 may be the e-bike 102a that is parked/ locked in the dock 106a. The e-bike 402 may include a bike computing device 408 and a bike battery pack 410. The dock 406 may include a dock interface 412 that may include one or more indicator lights 414a-c and a key tag slot 416. The bike battery pack 410 may include a button 418 that when pressed may activate the pedal-assist for the e-bike 402 as provided by the bike battery pack 410. The bike computing device 408 and/or the bike battery pack 410 may be mounted on any location on the e-bike 402. A classic bike may include the bike computing device 408 and may not include the bike battery pack 410. Though FIG. 4 shows an example of an e-bike parked/locked in a dock, in some implementations, a classic bike and/or an e-scooter, and/or a scooter may be parked/locked in a dock.

Figure 5:
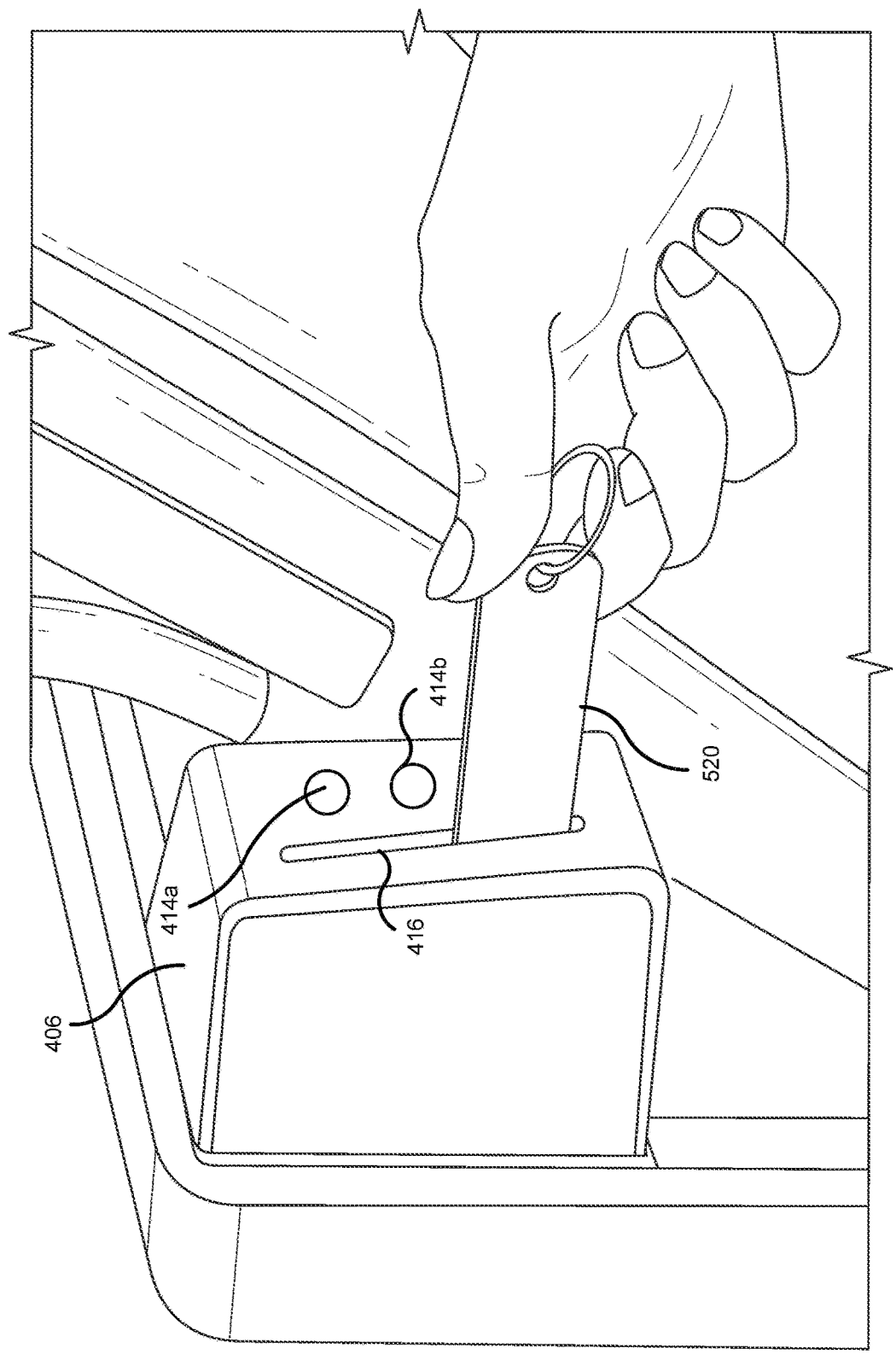
FIG. 5 is an illustration of the use of a key tag in a dock interface.

FIG. 5 is an illustration of the use of a key tag 520 in the dock interface 412 as shown in FIG. 4. For example, a key tag 520 may be used to unlock the e-bike 402. In some implementations, a key fob may be used to unlock the e-bike 402 in a manner similar to the use of the key tag 520. Information encoded on the key tag 520 may identify the owner of the key tag 520. A requestor may use a key tag to unlock the e-bike 402 for a ride. The key tag may provide information about the requestor such as payment for the ride. In some implementations, a technician may use a specially assigned key tag that may identify the technician, and/or the maintenance being provided by the technician when unlocking the e-bike 402. For example, a technician may be provided with or assigned a key tag for use when swapping battery packs. For example, a technician may be provided with or assigned another key tag for use when performing routine usage maintenance for the e-bike 402. For example, a technician may be provided with or assigned a key tag for use in undocking or unlocking the e-bike 402. A computing device included in the dock 406 may interface with a remote server (e.g., a dynamic transportation matching system) and may provide the remote server with information and/or data related to a state of the e-bike 402 based on the information provided by the key tag. The state may include, but is not limited to, maintenance being performed on the e-bike 402 by a technician as identified by the information included on the key tag 520 (e.g., a battery swap, routine maintenance, emergency maintenance, etc.) and use of the e-bike 402 for a ride by a requestor as identified by the information included on the key tag 520 (e.g., a requester identity).

In some implementations, in cases where a personal mobility vehicle (e.g., a bike, an e-bike, a scooter, and/or an e-scooter) is not parked/locked in a dock (e.g., a dockless personal mobility vehicle), the personal mobility vehicle may include a contactless system that utilizes, for example, radio-frequency identification (RFID) and/or near field communication (NFC) to unlock the personal mobility vehicle. In some implementations, a requestor and/or a technician may use a provided and/or assigned key tag or key fob held over a reader included (mounted on) the personal mobility vehicle to unlock the personal mobility vehicle for a ride or maintenance. In some implementations, a requestor and/or a technician may use a mobile computing device running an application that allows the mobile computing device, when held over a reader included (mounted on) the personal mobility vehicle, to unlock the personal mobility vehicle for a ride or maintenance. In some implementations, the reader may be in communication with a computing device included (mounted) on the personal mobility vehicle. The computing device of the personal mobility vehicle may be in further communication with a remote server (e.g., a dynamic transportation matching system). The computing device of the personal mobility vehicle may provide and/or exchange information and data with the remote server regarding the unlocking of the personal mobility vehicle.

Figure 6:
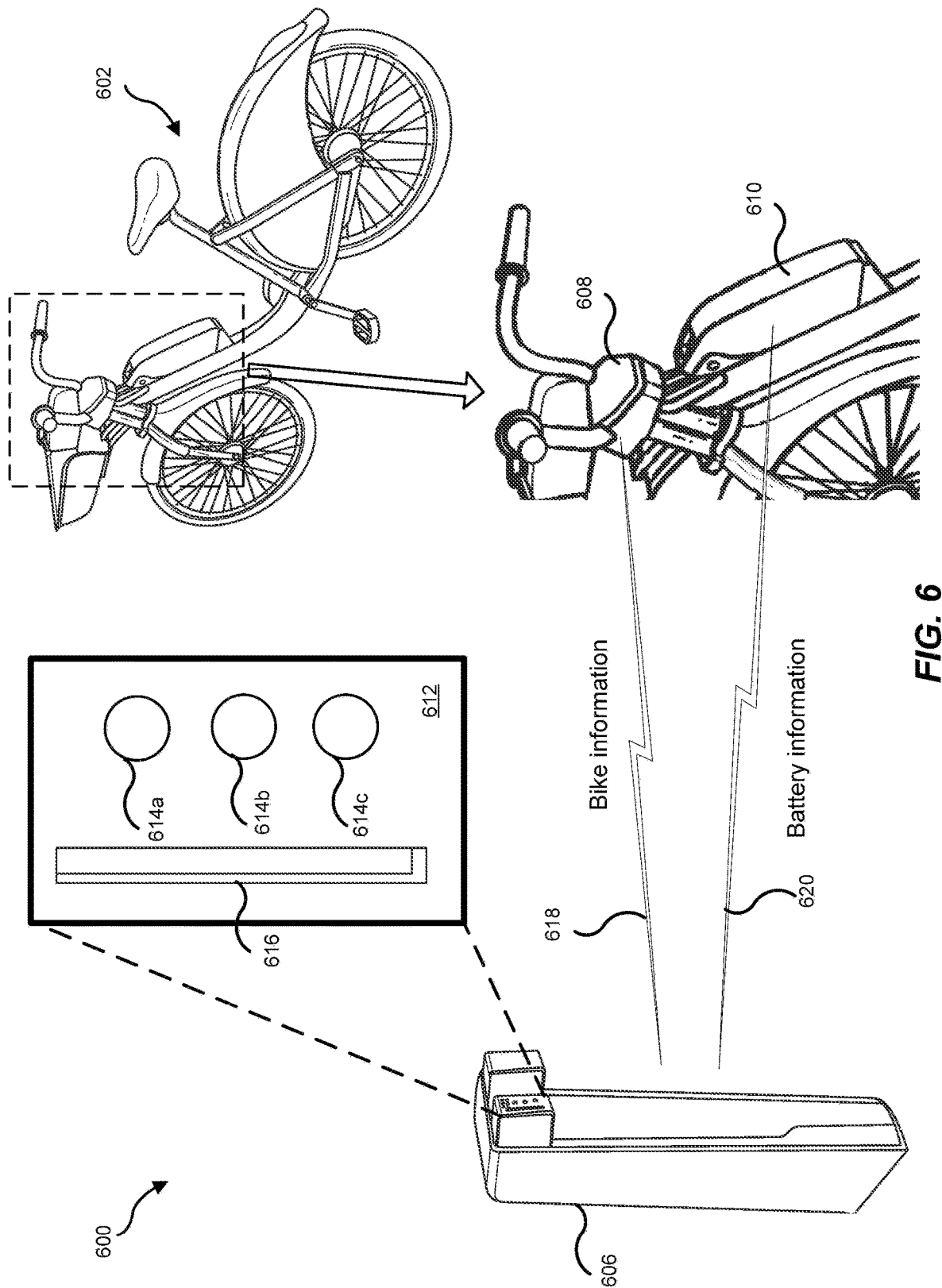
FIG. 6 is an illustration of an example system showing an example dock in communication with an example e-bike.

FIG. 6 is an illustration of an example system 600 showing an example dock 606 in communication with an example e-bike 602. The dock 606 may include a dock interface 612. The e-bike 602 may include a bike computing device 608 and a bike battery pack 610. The dock 606 may establish communicative connection 618 with the bike computing device 608 and communicative connection 620 with the battery pack 610 using any suitable wireless communication technology. The wireless communication technologies may include, but are not limited to, WiFi, Bluetooth, Bluetooth Low Energy (LE), Bluetooth 5, near-field communications (NFC), Z-Wave, ZigBee, and any other suitable short-range wireless communication technology.

The bike computing device 608 may provide information and data related to a state of the e-bike 602 to the dock 606 by way of the communicative connection 618. The battery pack 610 may provide information and data related to a state of one or more batteries included in the battery pack 610 to the dock 606 by way of the communicative connection 620. In some implementations, the dock 606 may establish the communicative connection 618 with the bike computing device 608 and not establish the communicative connection 620 with the battery pack 610. In these implementations, the bike computing device 608 may establish communicative connections with the dock 606 and the battery pack 610, providing information and data received from the battery pack 610 to the dock 606. The bike computing device 608 may establish a communicative connection with the battery pack 610 using one or more of the wireless communication technologies described herein. In some implementations, a wired connection may exist between the battery pack 610 and the bike computing device 608. The bike computing device 608 and the battery pack 610 may communicate using a proprietary and/or a standard wired communication protocol such as, for example, Universal Serial Bus (USB) or Controller Area Network (CAN) or other wired communication protocols as described herein.

The dock interface 612 may include may include one or more indicator lights 614a-c and a key tag slot 616 that operate in a similar manner as the indicator lights 414a-c and the key tag slot 416 in the dock interface 412 of the dock 404 as shown in FIG. 4 and FIG. 5. When the e-bike 602 is docked parked and/or locked in the dock 606, the indicator lights 614a-c may be illuminated to indicate one or more of an availability of the e-bike 602, a charge state of the one or more batteries included in the battery pack 610, and a maintenance state of the e-bike 602. For example, the indicator light 614a may be illuminated in green to indicate that the e-bike 602 is available for reserving for a ride and may be illuminated in red to indicate that the e-bike 602 is not available for reserving for a ride. For example, the indicator light 614b may be illuminated in green to indicate that the one or more batteries included in the battery pack are sufficiently charged (e.g., fully charged, at a charge level above a first threshold, etc.). The indicator light 614b may be illuminated in yellow to indicate that the one or more batteries included in the battery pack are at a charge level below the first threshold but above a second threshold (e.g., the battery pack may have enough charge for a short (e.g., less than one mile) ride). The indicator light 614b may be illuminated in red to indicate that the one or more batteries included in the battery pack should be recharged (e.g., the battery pack 610 should be swapped out). In this case, the e-bike 602 is may still be available for reserving for a ride for use as a classic bike (e.g., without the use of electrical pedal assistance). For example, the indicator light 614*c* may be illuminated in red (and otherwise not illuminated) if the e-bike 602 needs maintenance. In this case, the indicator light 614*a* may also be illuminated in red to indicate that the e-bike 602 is not available for reserving for a ride.

Figure 7:
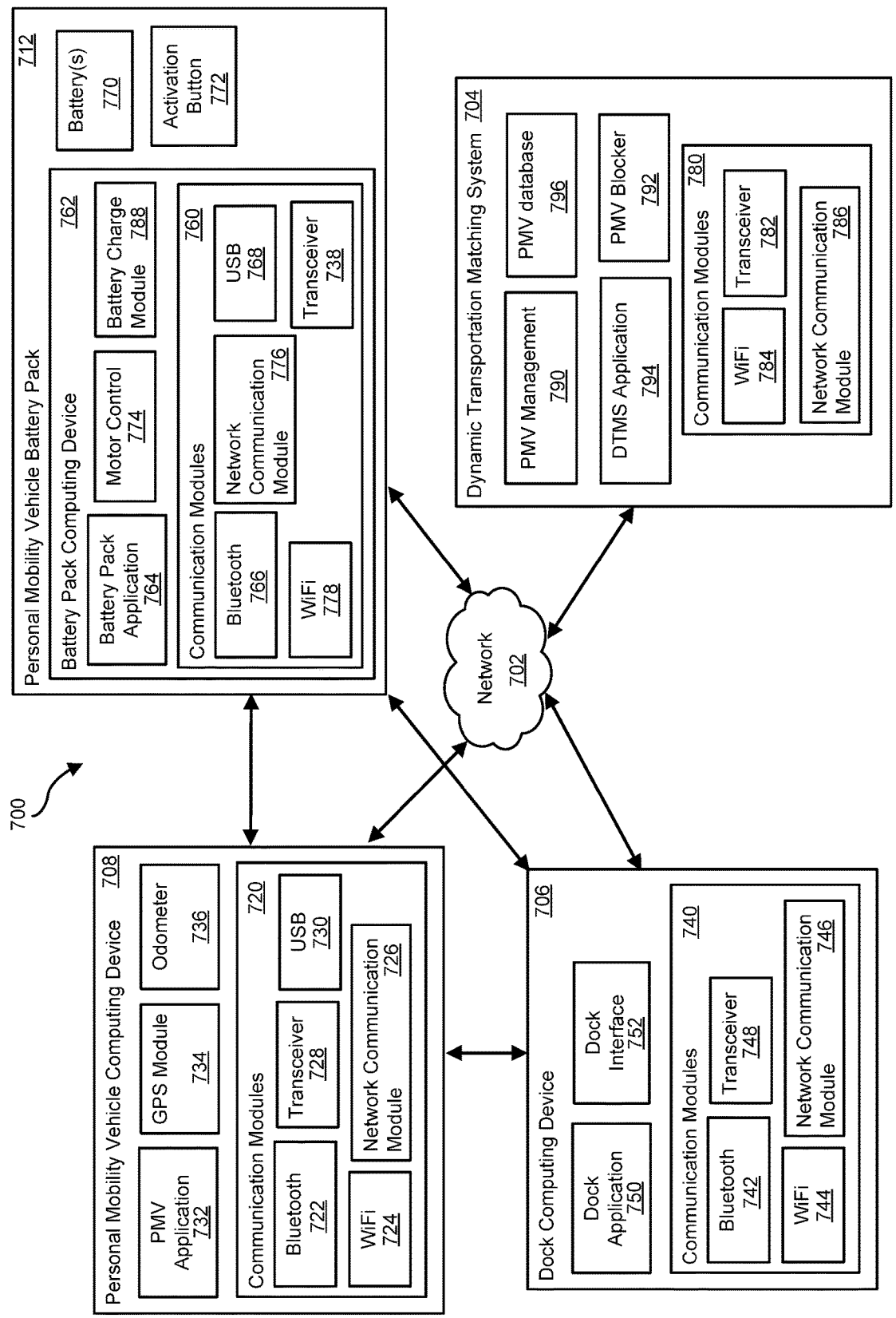
FIG. 7 is a block diagram of an example system for blocking the use of a personal mobility vehicle to perform needed maintenance on the personal mobility vehicle.

FIG. 7 is a block diagram of an example system 700 for blocking the use of a personal mobility vehicle to perform needed maintenance on the personal mobility vehicle. For example, referring to FIGS. 1, 3, 4, and 6, a personal mobility vehicle computing device 708 may represent and/or be included as part of the e-bike computing devices 108*a-c*, the classic bike computing device 110, the scooter computing device 302, the bike computing device 408, and the bike computing device 608. For example, referring to FIGS. 1, 4, and 6, the dock 106*a-d*, the dock 118, and the dock 406 may include a dock computing device 706. For example, referring to FIGS. 1, 3, 4, and 6, a personal mobility vehicle battery pack 712 may represent and/or be included as part of the battery packs 112*a-c*, the scooter battery pack 304, the bike battery pack 410, and the battery pack 610.

The personal mobility vehicle battery pack 712 may be configured with one or more applications, devices, and/or modules that may perform one or more of the steps described herein. The personal mobility vehicle battery pack 712 may include a battery pack computing device 762, a battery 770, and an activation button 772. The battery 770 may be a single battery or may be multiple batteries connected together to provide a battery source for a motor included in the personal mobility vehicle that when provided power allows for electrical-assistance for the personal mobility vehicle. The activation button 772 when pressed may enable the electrical-assistance for the personal mobility vehicle.

The battery charge module 788 may be hardware, firmware, and/or software configured to provide a state of charge of the battery 770 included in the battery pack computing device 762. For example, the battery charge module 788 may provide a reading of a voltage value for the battery 770. In some implementations, the voltage value for the battery 770 may be used with a fully charged voltage value for the battery 770 to determine (calculate) a percentage of charge remaining for the battery 770. The percentage of charge remaining for the battery 770 may be compared to a threshold value to determine one or more of if the battery 770 should be recharged, if the battery 770 has enough charge to complete a trip for the personal mobility vehicle, and if the personal mobility vehicle battery pack 712 should be swapped with another personal mobility vehicle battery pack that includes a fully charged battery.

In some implementations, the determining (calculating) of a percentage of charge remaining for the battery 770 and/or the comparing of the percentage of charge remaining for the battery 770 to the threshold value may be performed by the battery pack application 764. In some implementations, the battery pack computing device 762 may provide the battery reading(s) to the personal mobility vehicle computing device 708. In some implementations, the personal mobility vehicle application 732 may determine (calculate) the percentage of charge remaining for the battery 770 and/or may compare the percentage of charge remaining for the battery 770 to the threshold value. In some implementations, the personal mobility vehicle computing device 708 may provide the battery reading(s) to the dynamic transportation matching system 704 for use by the personal mobility vehicle management module 790 and/or the personal mobility vehicle blocker module 792 to determine (calculate) the percentage of charge remaining for the battery 770 and/or to compare the percentage of charge remaining for the battery 770 to the threshold value.

In some implementations, the battery pack computing device 762 may provide the battery reading(s) to the dock computing device 706. In some implementations, the dock application 750 may determine (calculate) the percentage of charge remaining for the battery 770 and/or may compare the percentage of charge remaining for the battery 770 to the threshold value. In some implementations, the dock computing device 706 may provide the battery reading(s) to the dynamic transportation matching system 704 for use by the personal mobility vehicle management module 790 and/or the personal mobility vehicle blocker module 792 to determine (calculate) the percentage of charge remaining for the battery 770 and/or to compare the percentage of charge remaining for the battery 770 to the threshold value.

In some implementations, the battery pack computing device 762 may provide the battery reading(s) to the dynamic transportation matching system 704 for use by the personal mobility vehicle management module 790 and/or the personal mobility vehicle blocker module 792 to determine (calculate) the percentage of charge remaining for the battery 770 and/or to compare the percentage of charge remaining for the battery 770 to the threshold value.

The battery pack computing device 762 may include a battery pack application 764, a motor control module 774, and communication modules 760. The communication modules 760 may include a Bluetooth module 766, a Universal Serial Bus (USB) module 768, a WiFi module 778, a network communication module 776, and a transceiver module 738.

The motor control module 774 may be hardware, firmware, and/or software configured to provide one or more controls (e.g., control signals) for the motor included in the personal mobility vehicle that when provided power can allow for electrical-assistance for the personal mobility vehicle. The battery pack application 764 may be implemented in hardware, firmware, and/or software. The battery pack computing device 762 may run (execute) the battery pack application 764 as described herein to implement the controls and communications for the personal mobility vehicle battery pack 712.

The personal mobility vehicle computing device 708 may be configured with one or more applications, devices, and/or modules that may perform one or more of the steps described herein. The personal mobility vehicle computing device 708 may include a personal mobility vehicle application 732, a Global Positioning System (GPS) module 734, an odometer 736, and communication modules 720. The communication modules 720 may include a Bluetooth module 722, a Universal Serial Bus (USB) module 730, a WiFi module 724, a network communication module 726, and a transceiver module 728.

The GPS module 734 may be hardware, firmware, and/or software configured to receive and use GPS coordinates to determine a location (e.g., latitude/longitude) of the personal mobility vehicle. The odometer 736 may be implemented in hardware, firmware, and/or software configured to determine a distance traveled by the personal mobility vehicle. For example, the odometer 736 may record a total distance traveled for the personal mobility vehicle for a trip. In another example, the odometer 736 may record a total distance traveled for the personal mobility vehicle over a particular timeframe (e.g., since the personal mobility vehicle was available for use in completing a trip (e.g., a trip rental), since a completed maintenance for the personal mobility vehicle, etc.). The personal mobility vehicle application 732 may be implemented in hardware, firmware, and/or software. The personal mobility vehicle computing device 708 may run (execute) the personal mobility vehicle application 732 as described herein to implement the controls and communications for the personal mobility vehicle computing device 708.

The dock computing device 706 may be configured with one or more applications, devices, and/or modules that may perform one or more of the steps described herein. The dock computing device 706 may include a dock application 750, a dock interface module 752, and communication modules 740. The communication modules 740 may include a Bluetooth module 742, a WiFi module 744, a network communication module 746, and a transceiver module 748. The dock interface 752 may be hardware, firmware, and/or software configured to implement and control a dock interface. For example, referring to FIG. 6, the dock interface 752 may represent and/or be included as part of the dock interface 612. The dock application 750 may be implemented in hardware, firmware, and/or software. The dock computing device 706 may run (execute) the dock application 750 as described herein to implement the controls, interfaces, and communications for the dock computing device 706. Referring to FIG. 6, the dock application 750 may interface with the dock interface 752 in order to control the indicator lights 614*a-c* and the key tag slot 616.

The personal mobility vehicle computing device 708, the dock computing device 706, and the battery pack computing device 762 may be any suitable type of computing device as described herein. The personal mobility vehicle computing device 708 may be mounted on or otherwise coupled to a personal mobility vehicle as shown, for example, in FIGS. 1, 3, 4, and 6. The personal mobility vehicle battery pack 712 may be mounted on or otherwise coupled to a personal mobility vehicle as shown, for example, in FIGS. 1, 3, 4, and 6. The dock computing device 706 may be incorporated into a dock.

The dynamic transportation matching system 704 may be configured with one or more applications, devices, repositories, and/or modules that may perform one or more of the steps described herein. The dynamic transportation matching system 704 may include a personal mobility vehicle database 796, a personal mobility vehicle management module 790, a personal mobility vehicle blocker module 792, a dynamic transportation matching system application 794, and communication modules 780. The communication modules 780 may include a WiFi module 784, a network communication module 786, and a transceiver module 782.

The dynamic transportation matching system 704 may represent any computing system and/or set of computing systems capable of matching transportation requests. As described, the dynamic transportation matching system 704 may be in communication with the personal mobility vehicle computing device 708. In some implementations, the dynamic transportation matching system 704 may be in communication with more than one (e.g., two or more) personal mobility vehicle computing devices coupled to respective personal mobility vehicles. In these implementations, the dynamic transportation matching system 704 may also be in communication with more than one (e.g., two or more) battery pack computing devices coupled to the respective personal mobility vehicles. As described, the dynamic transportation matching system 704 may be in communication with the dock computing device 706. In some implementations, the dynamic transportation matching system 704 may be in communication with more than one (e.g., two or more) dock computing devices.

The personal mobility vehicle database 796 may be a repository for storing information and data for personal mobility vehicles. In some implementations, the personal mobility vehicle database 796 may be external to the dynamic transportation matching system 704 but in communication with (connected to, or otherwise interfaced with) the dynamic transportation matching system 704.

The personal mobility vehicle management module 790 may be hardware, firmware, and/or software configured to manage a matching of a requestor with a personal mobility vehicle (manage the use of a personal mobility vehicle for a trip). The personal mobility vehicle blocker module 792 may be hardware, firmware, and/or software configured to manage a blocking of a personal mobility vehicle for maintenance. The dynamic transportation matching system application 794 may be implemented in hardware, firmware, and/or software. The dynamic transportation matching system 704 may run (execute) the dynamic transportation matching system application 794 as described herein to implement the controls, interfaces, and communications for the dynamic transportation matching system 704.

For example, the dynamic transportation matching system application 794 may access the personal mobility vehicle database 796 to determine if maintenance may be needed for a personal mobility vehicle. The dynamic transportation matching system application 794 may interface with the personal mobility vehicle management module 790 and the personal mobility vehicle blocker module 792 to determine a best location and time to block a personal mobility vehicle for use until scheduled maintenance is performed on the personal mobility vehicle. The dynamic transportation matching system application 794 may determine when and where the scheduled maintenance for the personal mobility vehicle is to be performed based on optimizing an operations effort for the personal mobility vehicle.

The WiFi module 778, the WiFi module 724, the WiFi module 778, and the WiFi module 784 may be hardware, firmware, and/or software configured to implement WiFi communications with (between) WiFi enabled devices. Each WiFi module may interface with a WiFi antenna included in the system or device that includes the WiFi module.

The Bluetooth module 766, the Bluetooth module 722, and the Bluetooth module 742 may be hardware, firmware, and/or software configured to implement Bluetooth communications with (between) Bluetooth enabled devices. The transceiver module 738, the transceiver module 728, the transceiver module 748, and the transceiver module 782 may include hardware and/or software and may be configured to implement wireless communications with (between) computing devices and systems that are wirelessly interfaced with or connected to a cellular telecommunications network.

The network communication module 776, the network communication module 726, the network communication module 746, and the network communication module 786 may be hardware, firmware, and/or software configured to implement wired and/or wireless communications with (between) computing devices and systems connected to or interfaced with a network (e.g., a network 702). The USB module 768 and the USB module 730 may be hardware, firmware, and/or software configured to implement USB communications with (between) USB enabled devices.

The battery pack computing device 762 may interact/interface with the personal mobility vehicle computing device 708, the dock computing device 706, and/or a dynamic transportation matching system 704. In some implementations, the battery pack computing device 762 may establish direct communications with the personal mobility vehicle computing device 708. In some implementations, the battery pack computing device 762 may establish direct communications with the dock computing device 706. In some implementations, the battery pack computing device 762 may establish communications with the dynamic transportation matching system by way of network 702.

The personal mobility vehicle computing device 708 may interact/interface with the dock computing device 706, the battery pack computing device 762, and/or the dynamic transportation matching system 704. In some implementations, the personal mobility vehicle computing device 708 may establish direct communications with the battery pack computing device 762. In some implementations, the personal mobility vehicle computing device 708 may establish direct communications with the dock computing device 706. In some implementations, the personal mobility vehicle computing device 708 may establish communications with the dock computing device 706 by way of a network 702. The personal mobility vehicle computing device 708 may establish communications with the dynamic transportation matching system 704 by way of the network 702.

The dock computing device 706 may interact/interface with the dynamic transportation matching system 704, the personal mobility vehicle computing device 708, and/or the battery pack computing device 762. In some implementations, the dock computing device 706 may establish direct communications with the battery pack computing device 762. In some implementations, the dock computing device 706 may establish direct communications with the personal mobility vehicle computing system 708. In some implementations, the dock computing device 706 may establish communications with the personal mobility vehicle computing device 708 by way of the network 702. The dock computing device 706 may establish communications with the dynamic transportation matching system 704 by way of the network 702.

In some implementations, the battery pack computing device 762 using one or more communication modules 760 may establish communications with the personal mobility vehicle computing device 708 by way of one or more of communication modules 720. In some implementations, the personal mobility vehicle may not be parked and/or locked in a dock and may be considered dockless. In some implementations, the personal mobility vehicle may be parked and/or locked in a dock. A battery pack application 764 may send battery information to the personal mobility vehicle computing device 708. The personal mobility vehicle application 732 may provide the battery information to the dynamic transportation matching system 704 by way of the network 702.

The battery pack computing device 762 may use one or more communication modules 760 to establish communications with the personal mobility vehicle computing device 708 by way of one or more communication modules 720. For example, the battery pack computing device 762 may establish direct wireless communication with the personal mobility vehicle computing device 708 using Bluetooth communication protocols implemented between Bluetooth module 766 and Bluetooth module 722. For example, the battery pack computing device 762 may establish direct wireless communication with the personal mobility vehicle computing device 708 using, for example, WiFi communication protocols implemented between WiFi communication module 778 and WiFi module 724. For example, the battery pack computing device 762 may establish direct communication with the personal mobility vehicle computing device 708 using Universal Serial Bus (USB) communication protocols implemented between USB module 768 and USB module 730. In some implementations, the battery pack computing device 762 may establish communication with the dynamic transportation matching system 704 by way of the network 702 using communication protocols implemented between network communication module 776 and network communication module 786.

In some implementations, the battery pack computing device 762 using one or more communication modules 760 may establish communications with the dock computing device 706 by way of one or more communication modules 740. In these implementations, the personal mobility vehicle may be docked (parked and/or locked) in a dock as shown, for example, in FIG. 1. In some implementations, referring to FIG. 6, a battery pack application 764 may send battery information by way of the communicative connection 620 between the battery pack computing device 762 and the dock computing device 706. A dock application 750 may provide the battery information to the dynamic transportation matching system 704 by way of the network 702.

In implementations where a personal mobility vehicle is parked or located in a dock, the personal mobility vehicle computing device 708 using one or more of the communication modules 720 may establish communications with the dock computing device 706 by way of one or more communication modules 740. In some implementations, the personal mobility vehicle computing device 708 may establish direct wireless communication with the dock computing device 706 using, for example, Bluetooth communication protocols implemented between the Bluetooth module 722 and Bluetooth module 742. In some implementations, the personal mobility vehicle computing device 708 may establish direct wireless communication with the dock computing device 706 using, for example, WiFi communication protocols implemented between the WiFi module 724 and WiFi module 744. In some implementations, the personal mobility vehicle computing device 708 may establish wireless communication with the dock computing device 706 by way of the network 702. In some implementations, the personal mobility vehicle computing device 708 may communicate with the network 702 by way of a network communication module 726. In some implementations, the dock computing device 706 may communicate with the network 702 by way of a network communication module 746. In some implementations, the dynamic transportation matching system 704 may be in communication with more than one (e.g., two or more) personal mobility vehicle computing devices. In some implementations, the dynamic transportation matching system 704 may be in communication with more than one (e.g., two or more) dock computing devices. For example, referring to FIG. 1, the dynamic transportation matching system 704 may be in communication with each of the docks 106a-d and the dock 108.

Additionally, or alternatively, the personal mobility vehicle computing device 708 may be a tablet computer, a personal digital assistant, or any other type or form of mobile computing device. In some examples, the personal mobility vehicle computing device 708 may be a device suitable for temporarily mounting on a personal mobility vehicle (e.g., for use by a requestor and/or provider for a transportation matching application, a navigation application, and/or any other application suited for the use of requestors and/or providers). Additionally, or alternatively, the personal mobility vehicle computing device 708 may be a device suitable for permanently mounting on or coupling to a personal mobility vehicle that has a personal mobility vehicle application installed on the computing device (e.g., a personal mobility vehicle application 732) to provide transportation services to transportation requestors and/or to communicate with the dynamic transportation matching system 704.

The personal mobility vehicle computing device 708 may include one or more personal mobility vehicle computing device modules. The personal mobility vehicle application 732 may represent any application, program, and/or module that may provide one or more services related to operating a personal mobility vehicle, communicating with a dock, communicating with a battery pack computing device, and/or providing transportation matching services. In addition, and as is described in greater detail herein, the personal mobility vehicle application 732 may provide the dynamic transportation matching system 704 with information about the personal mobility vehicle and information about a state of charge of a battery 770 included in the personal mobility vehicle battery pack 712. For example, the personal mobility vehicle application 732 may provide the dynamic transportation matching system 704 with a current location of the personal mobility vehicle using a Global Positioning System (GPS) module 734. In some implementations, the personal mobility vehicle application 732 may identify a current location of the personal mobility vehicle in geolocation coordinates (e.g., latitude, longitude, global positioning system (GPS) coordinates) using information and data provided by the GPS module 734. In some implementations, the personal mobility vehicle computing device 708 may provide the information and data provided by the GPS module 734 to the dynamic transportation matching system 704. The dynamic transportation matching system application 794 may identify a current location of the personal mobility vehicle using the geolocation coordinates and may store the location in the personal mobility vehicle database 796.

The personal mobility vehicle application 732 may also provide availability information for the personal mobility vehicle (e.g., if the personal mobility vehicle is currently in use, if the personal mobility vehicle is available for use (e.g., the personal mobility vehicle is not currently in use, the personal mobility vehicle is located (parked) in a dock, the personal mobility vehicle is not in a dock but locked and available for use, etc.)) to the dynamic transportation matching system 704. The dynamic transportation matching system 704 may receive and store the availability information for the personal mobility vehicle in the personal mobility vehicle database 796.

The personal mobility vehicle application 732 may provide the dynamic transportation matching system 704 with an odometer reading indicating a number of miles or meters of use for the personal mobility vehicle using an odometer 736. The dynamic transportation matching system 704 may store the odometer reading for the personal mobility vehicle in the personal mobility vehicle database 796. In some implementations, the personal mobility vehicle management module 790 and/or the personal mobility vehicle blocker module 792 may use the odometer reading alone or with other criteria to determine if the use of the personal mobility vehicle should be blocked in order to schedule and perform needed maintenance.

In addition, or in the alternative, the personal mobility vehicle application 732 may determine a state of charge of the battery 770 included in the personal mobility vehicle battery pack 712 based on information and data received from the battery pack computing device 762. The personal mobility vehicle computing device 708 may provide the state of charge of the battery 770 to the dynamic transportation matching system 704. The dynamic transportation matching system 704 may store the state of charge of the battery 770 in the personal mobility vehicle database 796.

The personal mobility vehicle management module 790 and/or the personal mobility vehicle blocker module 792 may use the availability information for the personal mobility vehicle, the odometer reading for the personal mobility vehicle, and/or the state of charge of the battery of the personal mobility vehicle to determine if the personal mobility vehicle is available for use. In some implementations, the personal mobility vehicle blocker module 792 may decide to block use of the personal mobility vehicle until the battery 770 (and in some implementations the personal mobility vehicle battery pack 712) can be swapped out with another battery. The personal mobility vehicle blocker module 792 may update the personal mobility vehicle database entry for the personal mobility vehicle to indicate that the personal mobility vehicle is not available for use in completing a trip. The personal mobility vehicle management module 790 may access the personal mobility vehicle database 796 when determining an availability and location of personal mobility vehicle for possible use in completing a trip.

Figure 8:
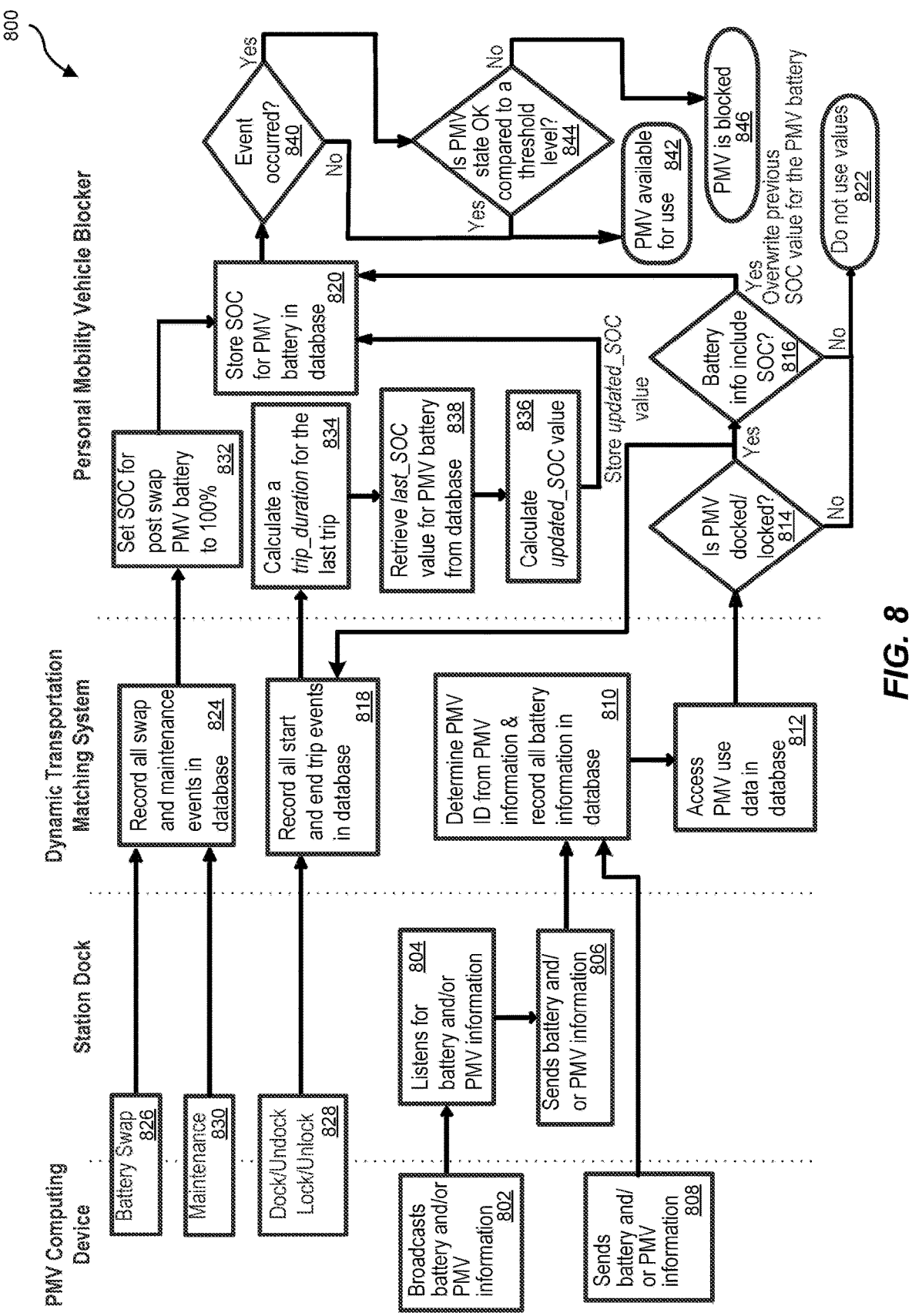
FIG. 8 is an illustration of an example flow of functions and communications between a personal mobility vehicle, a dock, and a dynamic transportation matching system including a personal mobility vehicle blocker.

FIG. 8 is an illustration of an example flow 800 of functions and communications between a personal mobility vehicle (e.g., the personal mobility vehicle computing device 708 as shown in FIG. 7), a dock (e.g., the dock computing device 706 as shown in FIG. 7), and a dynamic transportation matching system (e.g., the dynamic transportation matching system 704 as shown in FIG. 7) including a personal mobility vehicle blocker (e.g., the personal mobility vehicle blocker 792 as shown in FIG. 7). The description of the example flow 800 shown in FIG. 8 will be described with reference to FIG. 7.

In some implementations, referring to FIG. 7, a personal mobility vehicle computing device included in a personal mobility vehicle (e.g., the personal mobility vehicle computing device 708) may broadcast battery and/or personal mobility vehicle information (step 802). For example, in these implementations, the personal mobility vehicle Bluetooth module 722 may broadcast data using a Bluetooth communication protocol. The data may include information about the personal mobility vehicle and a state of the battery of the personal mobility vehicle.

In cases where the personal mobility vehicle is parked and/or locked in a dock (e.g., as shown for example in FIG. 1), a Bluetooth module included in the dock (e.g., the Bluetooth module 742 included in the dock computing device 706 included in the dock) may listen for Bluetooth broadcasts and may receive the battery and/or personal mobility vehicle information (step 804). The dock computing device 706 may communicatively connect to a dynamic transportation matching system (e.g., the dynamic transportation matching system 704) and may send the battery and/or personal mobility vehicle information to the dynamic transportation matching system (step 806).

In cases where the personal mobility vehicle is dockless (not parked in a dock), a personal mobility vehicle computing device included in a personal mobility vehicle (e.g., the personal mobility vehicle computing device 708) may communicatively connect to a dynamic transportation matching system (e.g., the dynamic transportation matching system 704) and may send battery and/or personal mobility vehicle information to the dynamic transportation matching system (step 808). As described with reference to FIG. 7, the personal mobility vehicle computing device (e.g., the personal mobility vehicle computing device 708) may receive the battery information from a battery pack computing device included in a battery pack (e.g., the battery pack computing device 762).

Once the dynamic transportation matching system 704 receives the battery and/or personal mobility vehicle information, the dynamic transportation matching system determines a personal mobility vehicle identifier (ID) from the received personal mobility vehicle information and records (stores) the battery information in the personal mobility vehicle database for the identified personal mobility vehicle (step 810). For example, the dynamic transportation matching system application 794 interfacing with the personal mobility vehicle management module 790 may determine the personal mobility vehicle ID. Using the personal mobility vehicle ID, the personal mobility vehicle management module 790 may store the battery information for the personal mobility vehicle in the personal mobility vehicle database 796 using the personal mobility vehicle ID.

The dynamic transportation matching system 704 may access the personal mobility vehicle database 796 using the personal mobility vehicle ID, retrieving use data for the identified personal mobility vehicle (step 812). The personal mobility vehicle blocker module 792 may determine, based on the personal mobility vehicle use data, if the personal mobility vehicle is in a docked or locked state (step 814). If the personal mobility vehicle is not determined to be in a docked or locked state, any received battery and/or personal mobility vehicle information may not be used (step 816). The flow 800 of functions and communications between the personal mobility vehicle (e.g., the personal mobility vehicle computing device 708), the dock (e.g., the dock computing device 706), and the dynamic transportation matching system (e.g., the dynamic transportation matching system 704) including the personal mobility vehicle blocker (e.g., the personal mobility vehicle blocker 792) may continue from step 802 or step 808.

The personal mobility vehicle blocker module 792 may determine, based on the personal mobility vehicle use data, that the personal mobility vehicle is in a docked or locked state (step 814). The dynamic transportation matching system 704, based on determining that the personal mobility vehicle is in a docked or locked state, may record the state in the database as an end of a trip event for the personal mobility vehicle (step 818). The personal mobility vehicle blocker module 792 may then determine if the received battery information includes a state of charge of the battery (step 816). If the received battery information does not include a state of charge of the battery, any received battery and/or personal mobility vehicle information may not be used (step 822). The flow 800 of functions and communications between the personal mobility vehicle (e.g., the personal mobility vehicle computing device 708), the dock (e.g., the dock computing device 706), and the dynamic transportation matching system (e.g., the dynamic transportation matching system 704) including the personal mobility vehicle blocker (e.g., the personal mobility vehicle blocker 792) may continue from step 802 or step 808.

If the personal mobility vehicle blocker module 792 determines that the received battery information does include a state of charge of the battery (step 816), the personal mobility vehicle blocker module 792 may store a state of charge for the battery of the identified personal mobility vehicle in the database (step 820) by overwriting the current value for the state of charge for the battery of the personal mobility vehicle that is currently stored in the personal mobility vehicle database 796.

The dynamic transportation matching system 704 may record all swap and/or maintenance events for personal mobility vehicles in the personal mobility vehicle database 796 (step 824). For example, referring to FIG. 5, a technician may be provided with a key tag specifically for use when swapping a battery pack of a personal mobility vehicle. In cases where the personal mobility vehicle is parked or locked in a dock, the technician may insert the key tag (e.g., the key tag 520) in the key tag slot 416 when swapping the battery pack of the personal mobility vehicle resulting in the battery swap action (step 826) being recorded in the personal mobility vehicle database 796 (step 824). In some implementations where the personal mobility vehicle may not be parked or locked in a dock (e.g., a dockless personal mobility vehicle), a technician may use an application running on a mobile computing device of the technician to communicate with the dynamic transportation matching system 704 by way of the network 702. The application may send the battery swap action (step 826) for recording for the personal mobility vehicle in the personal mobility vehicle database 796 (step 824).

For example, referring to FIG. 5, a technician may be provided with a key tag specifically for use when performing maintenance on a personal mobility vehicle which may include, but is not limited to, swapping, replacing, and/or repairing one or more components or parts of a personal mobility vehicle. In cases where the personal mobility vehicle is parked or locked in a dock, a technician may insert the key tag (e.g., the key tag 520) in the key tag slot 416 when performing the maintenance on the personal mobility vehicle resulting in the maintenance action (step 830) being recorded in the personal mobility vehicle database 796 (step 824). In some implementations where the personal mobility vehicle may not be parked or locked in a dock (e.g., a dockless personal mobility vehicle), a technician may use an application running on a mobile computing device of the technician to communicate with the dynamic transportation matching system 704 by way of the network 702. The application may send the maintenance action (step 826) for recording for the personal mobility vehicle in the personal mobility vehicle database 796 (step 824). In some implementations, information included on the key tag 520 may include the maintenance being performed by the technician (e.g., a part swap, a tune-up, etc.). In some implementations, the dynamic transportation matching system 704 may lock (not allow a usage of) a personal mobility vehicle until some scheduled maintenance is performed. The use of the key tag 520 and/or the application running on the mobile device of the technician to undock or unlock the personal mobility vehicle may be used to indicate that the scheduled maintenance was performed by the technician.

In some implementations, even when the personal mobility vehicle may be parked or locked in a dock, a technician may use an application running on a mobile computing device of the technician to communicate with the dynamic transportation matching system 704 by way of the network 702. In both implementations, the technician may interact with the application when performing any type of maintenance on the personal mobility vehicle such that the dynamic transportation matching system may record all maintenance events in the database.

The dynamic transportation matching system 704 may record all start and end trip events for a personal mobility vehicle in the personal mobility vehicle database (step 818). For example, referring to FIG. 5, in cases where the personal mobility vehicle is parked or locked in a dock, a requestor may insert a key tag (e.g., the key tag 520) in the key tag slot 416 when picking up (e.g., undocking, unlocking) the personal mobility vehicle for use for a trip. This action may result in an undocking (unlocking) action for the personal mobility vehicle (step 828). The insertion of the key tag 520 in the key tag slot 416 to undock the personal mobility vehicle may indicate the start of use of the personal mobility vehicle for a trip for the requestor, which may be recorded for the personal mobility vehicle (step 818). Once the requestor completes the trip, the requestor may park or lock the personal mobility vehicle in a dock (e.g., dock the personal mobility vehicle), inserting the key tag 520 in a key slot of the dock. This action may result in a docking (locking) action for the personal mobility vehicle (step 828). The insertion of the key tag 520 in the key slot of the dock when returning and docking the personal mobility vehicle may indicate the end of a use of the personal mobility vehicle for a trip for the requestor, which may be recorded for the personal mobility vehicle (step 818).

In cases where the personal mobility vehicle is not parked or locked in a dock (e.g., a dockless personal mobility vehicle), a requestor may use an application running on a mobile device of the requestor to communicate with the dynamic transportation matching system 704 by way of the network 702. The requestor may interact with a user interface provided by the application when reserving or picking up a personal mobility vehicle for a trip and when returning, dropping off, or locking a personal mobility vehicle once a trip is completed. The application may send the locking and the unlocking actions (step 828) for recording as trip start and end events for the personal mobility vehicle in the personal mobility vehicle database 796 (step 818).

In cases where a battery swap action (step 826) is recorded in the personal mobility vehicle database 796 (step 824) for a personal mobility vehicle, the dynamic transportation matching system may inform (notify) the personal mobility vehicle blocker module 792 of the event. The personal mobility vehicle blocker module 792 may set a state of charge (SOC) for a battery of the personal mobility vehicle whose battery was swapped to 100% (e.g., fully charged) (step 832). The personal mobility vehicle blocker module 792 may then store the state of charge for the battery of the personal mobility vehicle in the personal mobility vehicle database 796 (step 820).

In some implementations, a personal mobility vehicle battery pack (e.g., the personal mobility vehicle battery pack 712) may not include a battery charge module (e.g., the battery charge module 788). In these implementations, the system 700 may use information and data related to the personal mobility vehicle to determine (calculate) an estimate state of charge for the battery 770 for the personal mobility vehicle. For example, using the recorded start and end of trip events for the personal mobility vehicle that are stored in the personal mobility vehicle database 796 (step 818), the personal mobility vehicle blocker module may calculate a trip duration of a trip (a last trip) (step 834) based on a start time (t_start) associated with the start of the use of the personal mobility vehicle for the trip and an end time (t_end) associated with the end of the use of the personal mobility vehicle for the trip. For example, a trip duration for a trip may be determined (calculated) as in Equation 1.

$$\text{(trip\_duration)} = t\_end - t\_start \qquad \text{Equation (1)}$$

A battery (e.g., the battery 770) may have an expected (estimated, predicted) use lifetime (e.g., number of minutes, hours, days, etc.) based, at least in part, on a number of miles (meters) a personal mobility vehicle may be ridden until a fully charged battery will no longer have sufficient charge to assist the personal mobility vehicle (e.g., the battery will have zero or no charge remaining, the battery voltage level will be below a threshold voltage value). The expected use lifetime may be referred to as a total_expected_battery_riding_time. The total_expected_battery_riding_time value may be a number of minutes or a number of hours of expected battery-assisted travel time for a personal mobility vehicle. The personal mobility vehicle blocker module 792 may access the personal mobility vehicle database 796 to retrieve (obtain) a value for the last state of charge for the battery (last_SOC) (step 838). An updated state of charge value (Updated_SOC) for the battery of the personal mobility vehicle may be calculated as in Equation 2 (step 836).

$$\text{Updated\_SOC} = \text{last\_SOC} - (\text{trip\_duration}/\text{total\_expected\_battery\_riding\_time}) \qquad \text{Equation (2)}$$

Once calculated, the personal mobility vehicle blocker module 792 may store the value for the Updated_SOC for the battery in the personal mobility vehicle database 796 for the personal mobility vehicle (step 820). The storing may overwrite the last_SOC for the battery of the personal mobility vehicle with the Updated_SOC for the battery of the personal mobility vehicle.

The personal mobility vehicle blocker module 792 may store an updated state of charge value for a battery of a personal mobility vehicle in the personal mobility vehicle database 796 when one or more of a swap event (e.g., a battery of the personal mobility vehicle has been swapped) and a dock or lock event (e.g., a personal mobility vehicle is parked and/or locked in a dock at completion of a trip (ride), a dockless personal mobility vehicle is locked at the completion of a trip (ride)) occurs.

The personal mobility vehicle blocker module 792 may check if an event occurred for a personal mobility vehicle (step 840). For example, an event may be a swapping of a battery for the personal mobility vehicle, performance of maintenance on the personal mobility vehicle, a completion of a trip for the personal mobility vehicle, the docking and/or locking of the personal mobility vehicle, and the receipt of battery information for the personal mobility vehicle that includes a state of charge of the battery. If the personal mobility vehicle blocker module 792 determines that an event did not occur for the personal mobility vehicle, the personal mobility vehicle will be available for use by a requestor (step 842). The personal mobility vehicle will not be blocked by the personal mobility vehicle blocker module 792.

If the personal mobility vehicle blocker module 792 determines that an event did occur for the personal mobility vehicle (the events being one or more of the example events listed above), the personal mobility vehicle blocker module 792 will check if a state of the personal mobility vehicle is OK as compared to a threshold level (step 844). If a state of the personal mobility vehicle is determined to be OK as compared to a threshold level (step 844), the personal mobility vehicle will be available for use by a requestor (step 842).

For example, the state of the personal mobility vehicle may be a state of charge of the battery. The threshold level may be a charge value for the battery. If a value of the stored state of charge of the battery is less than a threshold value (e.g., a percentage charge of the battery, a voltage value for the battery) the state of the personal mobility vehicle will not be OK as compared to the threshold level (step 844) and the use of the personal mobility vehicle will be blocked (step 846). The personal mobility vehicle will be unavailable for use by a requestor. The personal mobility vehicle will be scheduled for a battery swap such that the operations effort for the personal mobility vehicle is optimized as described herein. The operations optimization may be directed towards minimizing an amount of time that the personal mobility vehicle is blocked, maximizing the usage of the current battery pack with the personal mobility vehicle without a rider running out of battery charge during a ride, and optimizing technician time and availability for performing the battery swap.

For example, the state of the personal mobility vehicle may be an amount of time (e.g., days, weeks, months, etc.) since a battery of the personal mobility vehicle was swapped. The threshold level may be an amount of time (e.g., a number of days, a number of weeks, a number of months, etc.). The dynamic transportation matching system 704 may store a timestamp (e.g., a date and time) for the battery swap event when recording the battery swap event in the database (step 824). If a value of the stored timestamp compared to a timestamp (e.g., date and time) for a recent event (e.g., a trip event, a docking or locking of the personal mobility vehicle) is greater than a threshold value (e.g., a number of days, a number of weeks, a number of months, etc.) the state of the personal mobility vehicle will not be OK as compared to the threshold level (step 844) and the use of the personal mobility vehicle may be blocked (step 846). The personal mobility vehicle will be unavailable for use by a requestor. The personal mobility vehicle will be scheduled for a battery swap such that the operations effort for the personal mobility vehicle is optimized as described herein. The operations optimization may be directed towards minimizing an amount of time that the personal mobility vehicle is blocked, maximizing the usage of the current battery pack with the personal mobility vehicle without a rider running out of battery charge during a ride, and optimizing technician time and availability for performing the battery swap.

For example, the state of the personal mobility vehicle may be a state of maintenance for the personal mobility vehicle. For example, a part or component of the personal mobility vehicle may be due for maintenance when the personal mobility vehicle has been ridden for a number of miles. The personal mobility vehicle computing device 708 may provide an odometer reading from the odometer 736 to the dynamic transportation matching system 704. The dynamic transportation matching system 704 may receive the odometer reading as part of the personal mobility vehicle information received and may record (store) the odometer reading in the database (step 810). If a value of the stored odometer reading is greater than a threshold value (e.g., a threshold (maximum) number of miles a personal mobility vehicle should be ridden before performing the maintenance) the state of the personal mobility vehicle will not be OK as compared to the threshold level (step 844) and the use of the personal mobility vehicle will be blocked (step 846). The personal mobility vehicle will be unavailable for use by a requestor. The personal mobility vehicle will be scheduled for the maintenance such that the operations effort for the personal mobility vehicle is optimized as described herein. The operations optimization may be directed towards minimizing an amount of time that the personal mobility vehicle is blocked, maximizing the usage of the personal mobility vehicle without the personal mobility vehicle breaking down or failing during a ride of a requestor, and optimizing technician time and availability for performing the maintenance.

For example, the state of the personal mobility vehicle may be an amount of time (e.g., days, weeks, months, etc.) since a maintenance task was performed on the personal mobility vehicle. The threshold level may be an amount of time (e.g., a number of days, a number of weeks, a number of months, etc.). The dynamic transportation matching system 704 may store a timestamp (e.g., a date and time) when recording the performance of the maintenance as an event in the database (step 824). If a value of the stored timestamp compared to a timestamp (e.g., date and time) for a recent event (e.g., a trip event, a docking or locking of the personal mobility vehicle) is greater than a threshold value (e.g., a number of days, a number of weeks, a number of months, etc.) the state of the personal mobility vehicle will not be OK as compared to the threshold level (step 844) and the use of the personal mobility vehicle may be blocked (step 846). The personal mobility vehicle will be unavailable for use by a requestor. The personal mobility vehicle will be scheduled for the maintenance task such that the operations effort for the personal mobility vehicle is optimized as described herein. The operations optimization may be directed towards minimizing an amount of time that the personal mobility vehicle is blocked, maximizing the usage of the personal mobility vehicle without the personal mobility vehicle breaking down or failing during a ride of a requestor, and optimizing technician time and availability for performing the maintenance task.

Control of the blocking of a personal mobility vehicle may be achieved by controlling the threshold level. The personal mobility vehicle blocker module 792 may allow each station where personal mobility vehicles may be locked and/or docked to define thresholds for blocking personal mobility vehicles located at the station. In some implementations, where the personal mobility vehicles may be dockless (not located at a station), the dynamic transportation matching system 704 (e.g., the personal mobility vehicle management module 790) may define thresholds for blocking personal mobility vehicles. For example, referring to FIG. 2, the dynamic transportation matching system 704 may define thresholds for blocking the bikes 202*a-f* and/or the scooters 222*a-d* based on a technician being dispatched to the station 230.

In some implementations, the dynamic transportation matching system 704 may determine, using the personal mobility vehicle management module 790, which stations may be hub stations where personal mobility vehicles may be grouped and a technician may be dispatched to perform battery swaps and/or personal mobility vehicle maintenance for the group of personal mobility vehicles, maximizing the use of the technician's time, which in turn may maximize an operations effort for the maintenance of the personal mobility vehicles.

The dynamic transportation matching system 704 may determine if a station may be considered a hub station based on one or more of a location of the station, a travel time for the technician to reach the station, the amount of traffic at the station, a proximity of the station to a location where batteries are charged, and a proximity of a location of the station to parts and/or components needed for a scheduled maintenance of a personal mobility vehicle. For example, a station may be considered a hub station if it is centrally located in a system of stations. For example, a station may be considered a hub station based on a number of docks available at the station. For example, a station may be considered a hub station based on a number of personal mobility vehicles docked and/or locked at the station (e.g., a number of docked personal mobility vehicle and a number of dockless personal mobility vehicles located at the station). For example, a station may be considered a hub station based on its proximity to a central dispatch location for technicians, parts, and/or charged batteries.

In some implementations, a threshold level (a threshold value) may be a percentage value. For example, a threshold level for a battery may be a percentage of charge left on the battery. In some implementations, a threshold level (a threshold value) may be a number. For example, a threshold level for a battery may be a voltage level of the battery. For example, a threshold level for maintenance may be a time frame (e.g., a number of hours, days, weeks, months, etc.).

In some implementations, a threshold level may be a default level. For example, the default level for a battery charge may be a percentage such that when a state of charge of a battery is less than the default percentage level the personal mobility vehicle may be unable to complete an average distance ride under electrical assistance. In another example, a default level for battery maintenance for a personal mobility vehicle may be a time frame common to all personal mobility vehicles. For example, the time frame may be a number of days and may be the same for all personal mobility vehicles. If a battery is not swapped out based on a state of charge of the battery before the time frame for the threshold level is exceeded, a personal mobility vehicle may be blocked to allow for the battery to be swapped with a fresh battery to ensure that the battery for the personal mobility vehicle is fully charged. In these cases, the battery swapping may be performed at a location and time to optimize an operations effort.

For example, the default level for maintenance may be a time frame that, if exceeded, the personal mobility vehicle may have a high probability (e.g., greater than 50%, greater than 75%, greater that 90%) of malfunctioning based on a failure of personal mobility vehicle.

In some implementations, the dynamic transportation matching system 704 may dynamically set a threshold level. For example, if a technician is available to swap batteries at a station, the dynamic transportation matching system 704 may adjust the threshold level for determining if a state of charge of a battery indicates the battery should be swapped (step 844), blocking the personal mobility vehicle for use (step 846) so that the technician may swap out the battery. Doing such may optimize an operations effort for the personal mobility vehicle by blocking the personal mobility vehicle for a minimal amount of time while capitalizing on the availability of the technician to swap the battery. The adjusted battery threshold level may be a percentage of available battery charge that is greater than, for example, a default level. For example, the adjusted battery threshold level may be a state of charge of the battery at 25% while the default level may be 10%

In another example, if a technician is available at a station, the dynamic transportation matching system 704 may dynamically set a threshold level for maintenance so that the personal mobility vehicle is determined to be in a state where the maintenance should be performed (step 844), blocking the personal mobility vehicle for use (step 846) so that the technician may perform the maintenance Doing such may optimize an operations effort for the personal mobility vehicle by blocking the personal mobility vehicle for a minimal amount of time while capitalizing on the availability of the technician to perform the maintenance. The adjusted maintenance threshold level may be a time frame that is less than, for example, a default level. For example, the adjusted time frame threshold level for performing the maintenance may be 330 days while the default level may be 365 days.

The dynamic transportation matching system 704 may determine if a threshold level should be adjusted based on one or more factors such as technician availability, time of day, and amount of adjustment. For example, if the technician is located at a station at a peak usage time, the dynamic transportation matching system 704 may determine that the battery charge threshold levels should not be adjusted to keep as many personal mobility vehicles available for use as possible. In another example, if a technician is located at a station at a low usage time (a down time) for personal mobility vehicle use by requestors, the dynamic transportation matching system 704 may adjust the battery threshold level to 50% (or another percentage where the personal mobility vehicle may be capable of at least one if not more electrically-assisted rides originating for a current location of the personal mobility vehicle) to leverage the availability of a technician and the availability of fully charged batteries for swapping. In another example, if a technician is en route to a location of a personal mobility vehicle (e.g., a station), the dynamic transportation matching system 704 may adjust the battery threshold level to another percentage (e.g., 25%) where the personal mobility vehicle may be capable of at least one electrically-assisted ride originating from the current location of the personal mobility vehicle to leverage the availability of a technician and the availability of fully charged batteries for swapping.

In implementations described herein, a current location of the personal mobility vehicle as compared to known or potential future location of a personal mobility vehicle may determine if an efficient condition exists for performing maintenance on the personal mobility vehicle. As described herein, a dynamic transportation matching system may be proactive in blocking a personal mobility vehicle for use when performing maintenance on the personal mobility vehicle when conditions are favorable as opposed to a blocking of the use of the personal mobility vehicle occurring automatically independent of a location of the personal mobility vehicle or other favorable condition for the performing of the maintenance. The dynamic transportation matching system proactively blocking a personal mobility vehicle for use when performing maintenance on the personal mobility vehicle when conditions are favorable (e.g., a known location of the personal mobility vehicle) may reduce a level of uncertainty as to where and when the maintenance may occur.

Maximizing the use of a personal mobility vehicle may include having the personal mobility vehicle be satisfactorily operational to a requestor. As such, it may be beneficial to schedule the maintenance of a personal mobility vehicle before the personal mobility vehicle may become inoperable, avoiding an unsatisfactory experience by a requestor (e.g., personal mobility vehicle breaks down during a trip, electrically-assisted personal mobility vehicle runs out of battery charge during a trip, etc.). Maximizing use of a personal mobility vehicle may include minimizing an amount of time a personal mobility vehicle is unavailable for use by a requestor while maximizing the efficiencies of technicians needed to perform the maintenance thereby maximizing resource allocation within a transportation network for performing the maintenance. Minimizing an amount of time a personal mobility vehicle is unavailable for use by a requestor may also minimize delays and any other types of inconveniences a requestor may experience when trying to reserve a personal mobility vehicle for a trip. Minimizing an amount of time a personal mobility vehicle is unavailable for use by a requestor may improve response times for requesting personal mobility vehicles for trips.

Efficiently scheduling and performing maintenance on a personal mobility vehicle may improve operation times for the personal mobility vehicle (e.g., the personal mobility vehicle may have less down-time (e.g., time it is unavailable for use)).

FIG. 9 is an illustration of an example table 900 showing personal mobility vehicle information and battery status information for respective personal mobility vehicles. Referring to FIG. 7, the table 900 may be stored in the personal mobility vehicle database 796. The table 900 includes a station name column 902, a number of personal mobility vehicles blocked column 904, a personal mobility vehicle identifier (ID) column 906, a time blocked column 908, a duration since block column 910, a duration since a last battery swap column 912, and a duration since maintenance column 914. In some implementations, the table 900 may include additional entries such as individual column entries for specific types of personal mobility vehicle maintenance tasks. The table 900 may include additional rows for personal mobility vehicles block at other stations.

The station name column 902 may list a name of a station (a location of a station, an address of a station) where a personal mobility vehicle may be located and/or docked. For example, station 916 may be designated as a hub station. Referring to FIG. 1, for example, station 916 may be the station 100. The number of personal mobility vehicles blocked column 904 may list a number of personal mobility vehicles currently blocked at the station (e.g., number of blocked personal mobility vehicles 918). The personal mobility vehicle ID column 906 may list a personal mobility vehicle identifier (e.g., a personal mobility vehicle number) associated with a blocked personal mobility vehicle. For example, referring to FIG. 1, personal mobility vehicles that are blocked are listed as personal mobility vehicle ID entries 920a-d. The time blocked column 908 may list a timestamp for a time when a block of the personal mobility vehicle began. For example, time blocked entries 922a-d are for respective personal mobility vehicle ID entries 920a-d. The duration since block column 910 may list an amount of time (a time period, a timeframe) that a personal mobility vehicle has been blocked. For example, duration since block entries 924a-d are for respective personal mobility vehicle ID entries 920a-d. The duration since battery swap column 912 may list an amount of time (a time period, a timeframe) since a battery of the personal mobility vehicle was last swapped out. For example, duration since battery swap entries 926b-d are for respective personal mobility vehicle ID entries 920b-d. The duration since maintenance column 914 may list an amount of time (a time period, a timeframe) since maintenance of the personal mobility vehicle was performed. For example, duration since maintenance entry 926a is for the respective personal mobility vehicle ID entries 920a.

The dynamic transportation matching system 704 may gather the information and data included in the table 900 and generate the table 900 in real-time. For example, the information and data included in the table 900 may be gathered on a regular time basis (e.g., daily, every set number of hours, hourly, every morning and every evening, weekly, every weekday, etc.). The dynamic transportation matching system 704 may use the information and data to determine when and where to assign a technician to perform personal mobility vehicle battery swaps and/or maintenance for optimizing an operations effort for the management of personal mobility vehicles.

Figure 10:
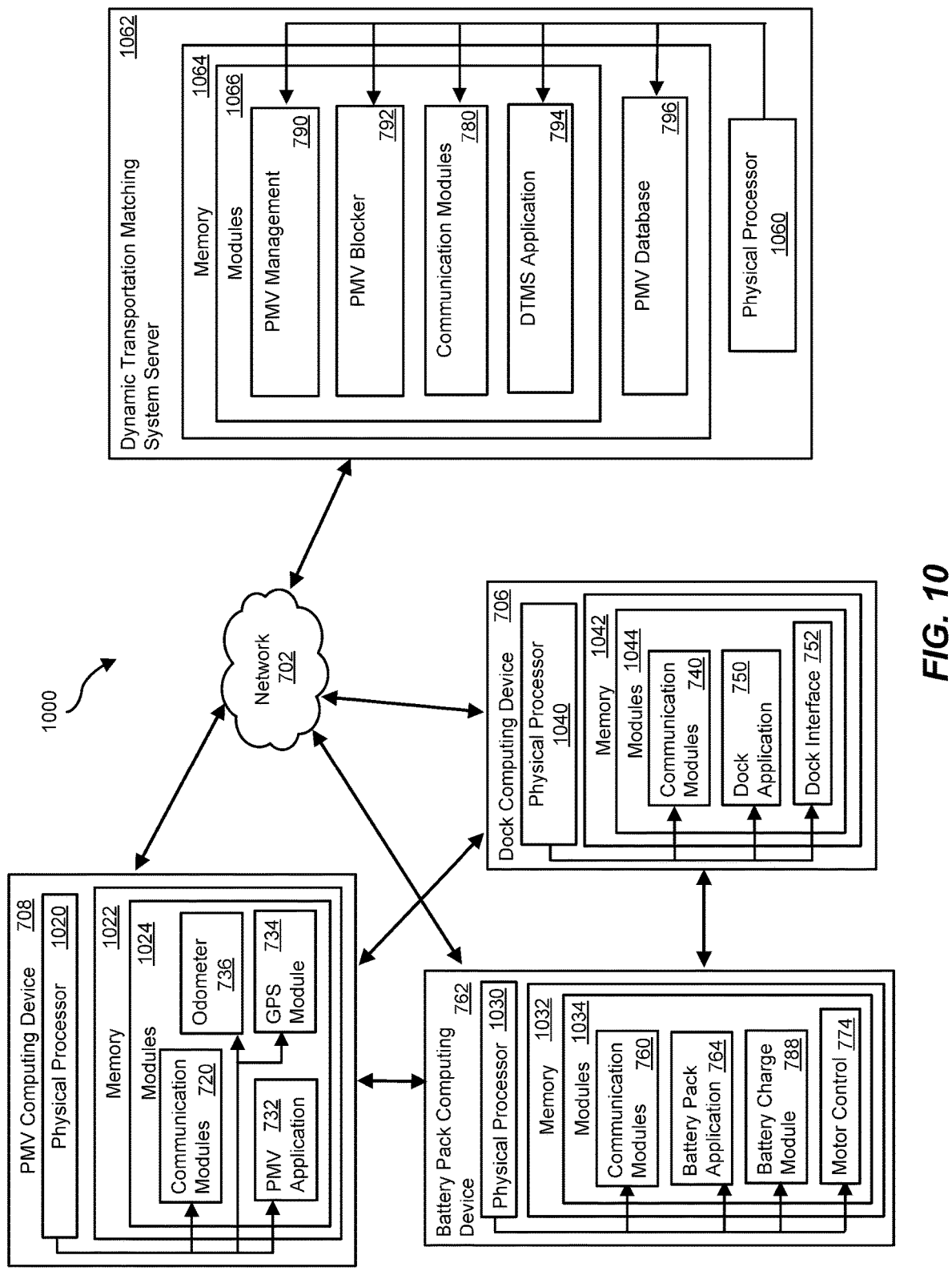
FIG. 10 is a block diagram of an example transportation management system that utilizes and controls the blocking and unblocking of personal mobility vehicles.

FIG. 10 is a block diagram of an example transportation management system 1000 that utilizes and controls the blocking and unblocking of personal mobility vehicles.

Referring at times to FIG. 7, the transportation management system 1000 may include a dynamic transportation matching system server 1062. The dynamic transportation matching system server 1062 may include a memory 1064 which may include one or more modules 1066 and the personal mobility vehicle database 796. The module(s) 1066 may include the personal mobility vehicle management module 790, the personal mobility vehicle blocker module 792, the dynamic transportation matching system application 794, and the communication modules 780. The dynamic transportation matching system server 1062 may include at least one physical processor 1060. In some implementations, the dynamic transportation matching system 704 may be included as part of the dynamic transportation matching system server 1062.

The transportation management system 1000 may include the personal mobility vehicle computing device 708 that is communicatively coupled to the dynamic transportation matching system server 1062 by way of the network 702. The transportation management system 1000 may include the battery pack computing device 762 that is communicatively coupled to the dynamic transportation matching system server 1062 by way of the network 702. The transportation management system 1000 may include the dock computing device 706 that is communicatively coupled to the dynamic transportation matching system server 1062 by way of the network 702. In addition, or in the alternative, the personal mobility vehicle computing device 708, the dock computing device 706, and the battery pack computing device 762 may engage in direct communications with one another.

The personal mobility vehicle computing device 708 includes a memory 1022 which may include one or more module(s) 1024. The module(s) 1024 may include the personal mobility vehicle application 732, the GPS module 734, the odometer 736, and the communication modules 720. The personal mobility vehicle computing device 708 may include at least one physical processor 1020.

The battery pack computing device 762 includes a memory 1032 which may include one or more module(s) 1034. The module(s) 1034 may include the battery pack application 764, the battery charge module 788, the motor control module 774, and the communication modules 760. The battery pack computing device 762 may include at least one physical processor 1030.

The dock computing device 706 includes a memory 1042 which may include one or more module(s) 1044. The module(s) 1044 may include the dock application 750, the dock interface 752, and the communication modules 740. The dock computing device 706 may include at least one physical processor 1040.

Figure 11:
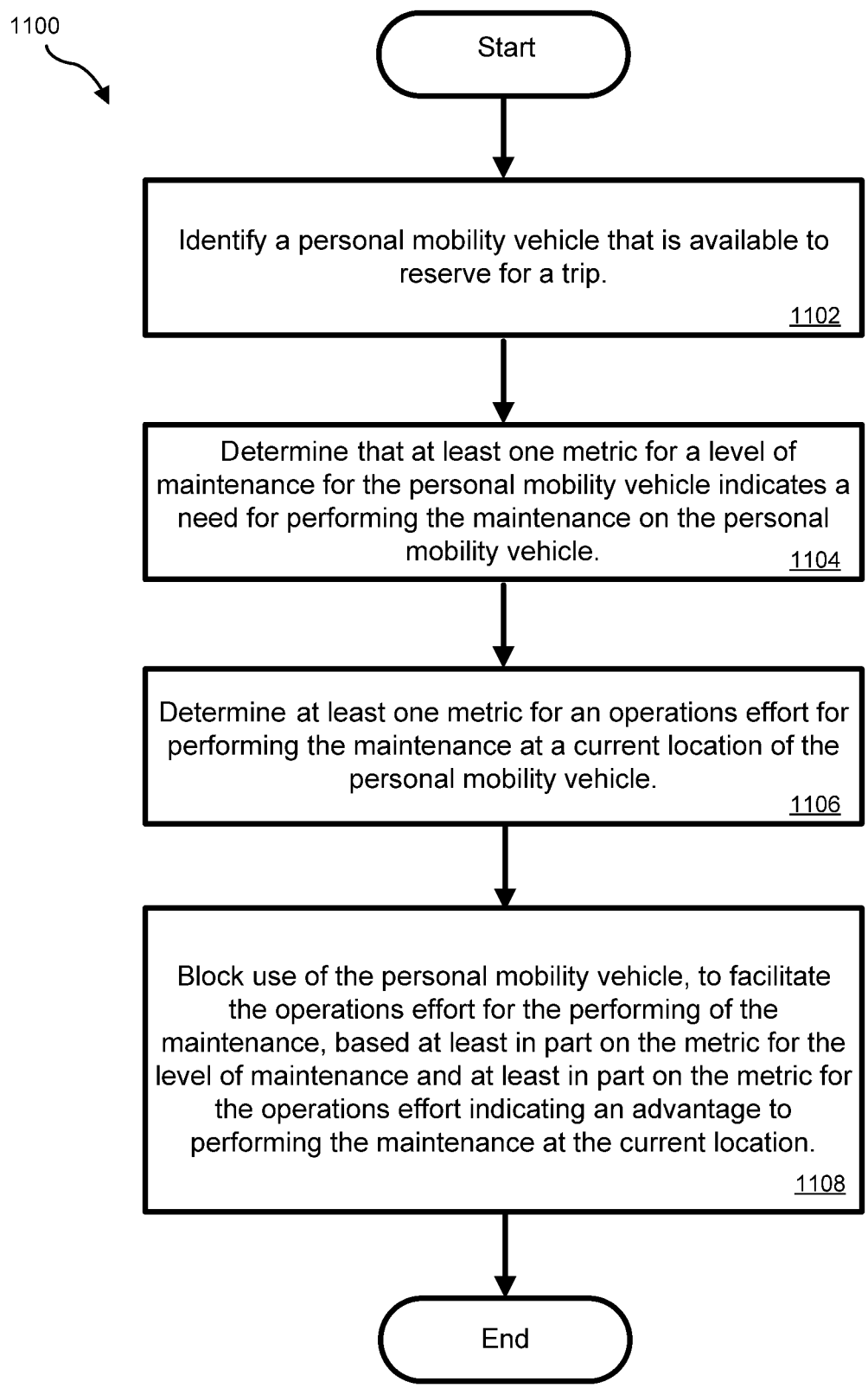
FIG. 11 is a flow diagram of an exemplary computer-implemented method for blocking the use of a personal mobility vehicle based on one or more metrics for the personal mobility vehicle.

FIG. 11 is a flow diagram of an exemplary computer-implemented method 1100 for blocking the use of a personal mobility vehicle based on one or more metrics for the personal mobility vehicle. The steps shown in FIG. 11 may be performed by any suitable computer-executable code and/or computing system, including the system(s) illustrated in FIG. 7 and FIG. 10. In one example, each of the steps shown in FIG. 11 may represent an algorithm whose structure includes and/or is represented by multiple sub-steps, examples of which will be provided in greater detail below.

As illustrated in FIG. 11, at step 1102 one or more of the systems described herein may identify a personal mobility vehicle that is available to reserve for a trip. For example, the dynamic transportation matching system 704 may determine that a personal mobility vehicle (a personal mobility vehicle including the personal mobility vehicle computing device 708) may be reserved for a trip.

The systems described herein may perform step 1102 in a variety of ways. In one example, the dynamic transportation matching system 704 may determine that a personal mobility vehicle included in the station 100 (as shown in FIG. 1) may be reserved by a requestor for a trip.

As illustrated in FIG. 11, at step 1104 one or more of the systems described herein may determine that at least one metric for a level of maintenance for the personal mobility vehicle indicates a need for performing the maintenance on the personal mobility vehicle.

For example, the dynamic transportation matching system 704 may receive information and data related to an identifier for the personal mobility vehicle and a state of the personal mobility vehicle. The dynamic transportation matching system 704 may access the personal mobility vehicle database 796 using the identifier for the personal mobility vehicle to obtain at least one metric for a level of maintenance for the personal mobility vehicle. The at least one metric for a level of maintenance for the personal mobility vehicle may be compared to the received state of the personal mobility vehicle, indicating a need for performing the maintenance on the personal mobility vehicle.

The systems described herein may perform step 1104 in a variety of ways. In one example, the dynamic transportation matching system 704 may receive a current state of charge of a battery of the personal mobility vehicle. In some implementations, the dynamic transportation matching system 704 may access the personal mobility vehicle database 796 using the identifier for the personal mobility vehicle to obtain a last state of charge of the battery for use in determining a current state of charge of the battery based on information and data about a completed trip of the personal mobility vehicle. A threshold level for a charge of the battery may be compared to the current state of charge of the battery, the comparison indicating a need for performing a battery swap for the personal mobility vehicle.

In another example, referring to FIG. 9, the dynamic transportation matching system 704 may access the personal mobility vehicle database 796 using the identifier for the personal mobility vehicle. The dynamic transportation matching system 704 may determine that a need exists for performing maintenance on the personal mobility vehicle based on duration since the last time the maintenance was done on the personal mobility vehicle as compared to a threshold level for the performance of the maintenance.

As illustrated in FIG. 11, at step 1106 one or more of the systems described herein may determine at least one metric for an operations effort for performing the maintenance at a current location of the personal mobility vehicle. For example, the dynamic transportation matching system 704 may determine that a technician is (or will be) readily available to perform the maintenance on the personal mobility vehicle at the current location of the personal mobility vehicle.

The systems described herein may perform step 1106 in a variety of ways. In one example, a personal mobility vehicle may be at a station identified as a hub. A technician may be dispatched to the station and is available to perform the maintenance on the personal mobility vehicle in a timely manner, keeping an amount of time the personal mobility vehicle may be unavailable for use (blocked) to a minimum, therefore, leveraging the availability of the technician while keeping the personal mobility vehicle blocked for a short period of time.

As illustrated in FIG. 11, at step 1108 one or more of the systems described herein may block use of the personal mobility vehicle, to facilitate the operations effort for the performing of the maintenance, based at least in part on the metric for the level of maintenance and at least in part on the metric for the operations effort indicating an advantage to performing the maintenance at the current location. For example, the personal mobility vehicle blocker module 792 included in the dynamic transportation matching system 704 may block the use of the personal mobility vehicle such that a technician may perform the maintenance efficiently and in a timely manner, minimizing an amount of time that the personal mobility vehicle is blocked (not available for use) while maximizing usage of the technician.

The systems described herein may perform step 1108 in a variety of ways. In one example, the personal mobility vehicle blocker module 792 may block use of a personal mobility vehicle based on a state of charge of a battery of the personal mobility vehicle as compared to a threshold level and based on a technician being available at a location of the personal mobility vehicle and having fully charged batteries for swapping with the battery of the personal mobility vehicle. Doing such may leverage the availability of a technician at a location of the personal mobility vehicle, minimizing an amount of time that the personal mobility vehicle may not be available for use.

In another example, the personal mobility vehicle blocker module 792 may block use of a personal mobility vehicle based on a duration since maintenance was performed on the personal mobility vehicle as compared to a threshold level and based on a technician being available at allocation of the personal mobility vehicle and being available to perform the maintenance on the personal mobility vehicle. Doing such may leverage the availability of a technician at a location of the personal mobility vehicle, minimizing an amount of time that the personal mobility vehicle may not be available for use.

In one example, a computer-implemented method may include identifying, by a computing system, a personal mobility vehicle that is available to reserve for a trip, determining, by the computing system, that at least one metric for a level of maintenance for the personal mobility vehicle indicates a need for performing the maintenance on the personal mobility vehicle, determining, by the computing system, at least one metric for an operations effort for performing the maintenance at a current location of the personal mobility vehicle, and blocking use of the personal mobility vehicle, to facilitate the operations effort for the performing of the maintenance, based at least in part on the metric for the level of maintenance and at least in part on the metric for the operations effort indicating an advantage to performing the maintenance at the current location.

In some examples, the at least one metric for the level of the maintenance for the personal mobility vehicle may be a state of charge of a battery included on the personal mobility vehicle.

In some examples, the computer-implemented method may further include calculating, by the computer system, the state of charge of the battery by accessing, by the computer system, a previous state of charge of the battery stored in a database, the previous state of charge of the battery being a percentage remaining battery charge for the battery, determining, by the computer system, a total expected riding time for the personal mobility vehicle, determining, by the computer system, a time duration of a most recent trip of the personal mobility vehicle, determining, by the computer system, a percentage of battery usage for the most recent trip by dividing the time duration of the most recent trip by the total expected riding time, and subtracting the percentage of battery usage for the most recent trip from the previous state of charge of the battery.

In some examples, the at least one metric for the level of the maintenance for the personal mobility vehicle may be a number of days since a battery of the personal mobility vehicle was replaced with another fully charged battery.

In some examples, the personal mobility vehicle may be located in a dock at a station.

In some examples, the at least one metric for the operations effort for performing the maintenance at a current location of the personal mobility vehicle may be an availability of a service technician at the station.

In some examples, the at least one metric for the operations effort for performing the maintenance at a current location of the personal mobility vehicle may further include a number of personal mobility vehicles located at the station.

In some examples, the personal mobility vehicle may be located between a location of a service technician and a station, the personal mobility vehicle able to be transported to the station by the service technician.

In some examples, the at least one metric for the operations effort for performing the maintenance at a current location of the personal mobility vehicle may be an availability of a service technician at a station.

In some examples, the maintenance may include replacement of a battery of the personal mobility vehicle with another fully charged battery.

In some examples, the at least one metric for an operations effort for performing the maintenance at a current location of the personal mobility vehicle may include a number of minutes that the personal mobility vehicle will be blocked for use.

In some examples, determining that the at least one metric for a level of maintenance for the personal mobility vehicle indicates a need for performing maintenance on the personal mobility vehicle may include comparing a current state of the personal mobility vehicle to a threshold level for the state of the personal mobility vehicle.

In some examples, the computer-implemented method may further include dynamically setting, by the computing system, the threshold level for the state of the personal mobility vehicle in order to optimize the operations effort for performing the maintenance.

In some examples, the personal mobility vehicle may be located in a dock.

In some examples, a computing device included in the personal mobility vehicle may communicate a state of charge of a battery of the personal mobility vehicle to a computing device included in the dock.

In some examples, the personal mobility vehicle may be an electrically-assisted bicycle.

In some examples, the advantage to performing the maintenance at the current location may be a decrease in an expected operations effort.

A corresponding system may include one or more physical processors and one or more memories coupled to one or more of the physical processors, the one or more memories comprising instructions operable when executed by the one or more physical processors to cause the system to perform operations comprising identifying a personal mobility vehicle that is available to reserve for a trip, determining that at least one metric for a level of maintenance for the personal mobility vehicle indicates a need for performing the maintenance on the personal mobility vehicle, determining at least one metric for an operations effort for performing the maintenance at a current location of the personal mobility vehicle, and blocking use of the personal mobility vehicle, to facilitate the operations effort for the performing of the maintenance, based at least in part on the metric for the level of maintenance and at least in part on the metric for the operations effort indicating an advantage to performing the maintenance at the current location.

A corresponding non-transitory computer-readable storage medium may include computer-readable instructions that, when executed by at least one processor of a computing device, cause the computing device to identify a personal mobility vehicle that is available to reserve for a trip, determine that at least one metric for a level of maintenance for the personal mobility vehicle indicates a need for performing the maintenance on the personal mobility vehicle, determine at least one metric for an operations effort for performing the maintenance at a current location of the personal mobility vehicle, and block use of the personal mobility vehicle, to facilitate the operations effort for the performing of the maintenance, based at least in part on the metric for the level of maintenance and at least in part on the metric for the operations effort indicating an advantage to performing the maintenance at the current location.

Figure 12:
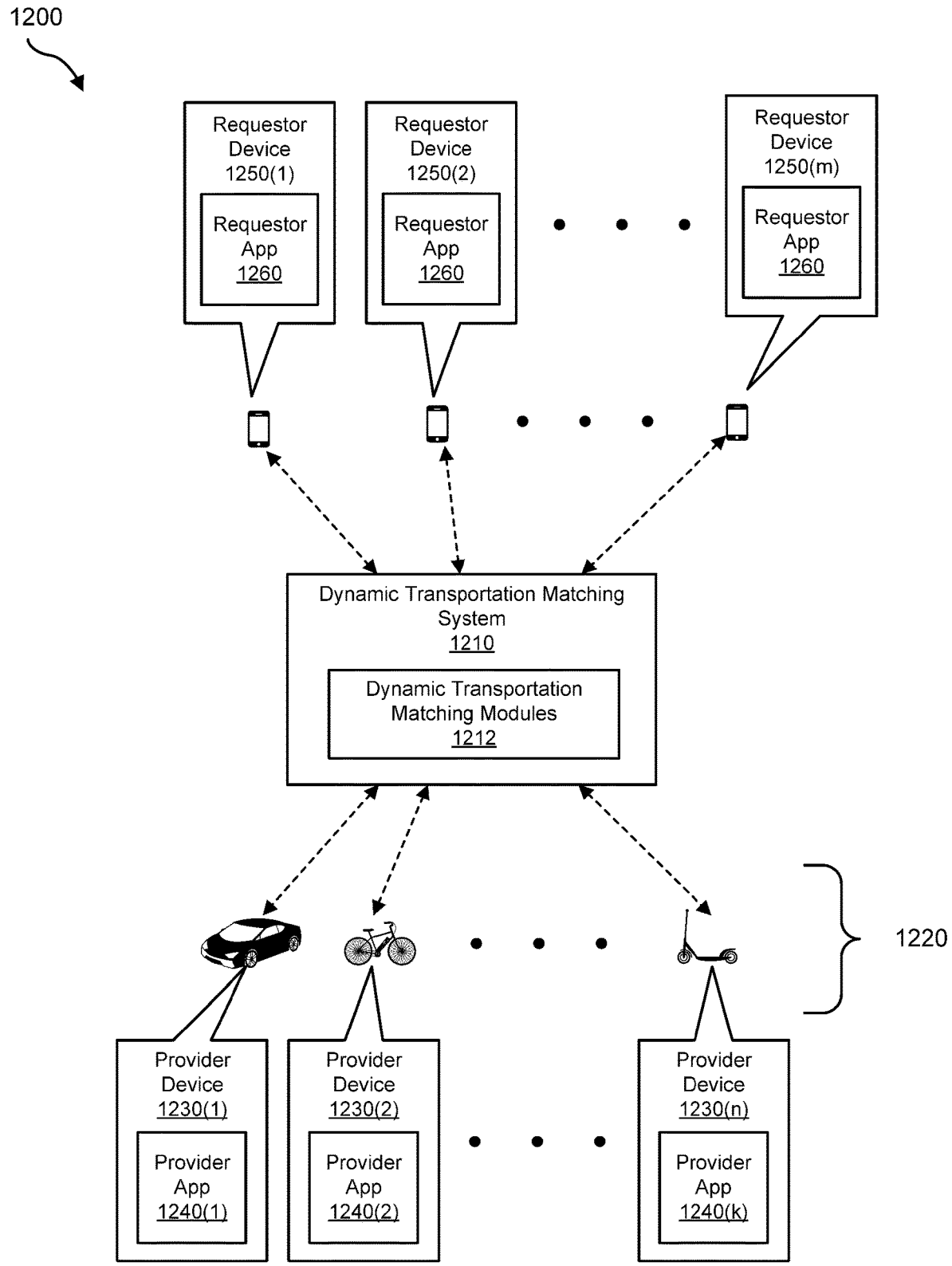
FIG. 12 illustrates an example system for matching transportation requests with a dynamic transportation network that includes personal mobility vehicles.

FIG. 12 illustrates an example system 1200 for matching transportation requests with a dynamic transportation network that includes personal mobility vehicles. As shown in FIG. 12, a dynamic transportation matching system 1210 may be configured with one or more dynamic transportation matching modules 1212 that may perform one or more of the steps described herein. Dynamic transportation matching system 1210 may represent any computing system and/or set of computing systems capable of matching transportation requests. Dynamic transportation matching system 1210 may be in communication with computing devices in each of a group of vehicles 1220. Vehicles 1220 may represent any vehicles that may fulfill transportation requests. In some examples, vehicles 1220 may include disparate vehicle types and/or models. For example, vehicles 1220 may include road-going vehicles and personal mobility vehicles. In some examples, some of vehicles 1220 may be standard commercially available vehicles. According to some examples, some of vehicles 1220 may be owned by separate individuals (e.g., transportation providers). Furthermore, while, in some examples, many or all of vehicles 1220 may be human-operated, in some examples many of vehicles 1220 may also be autonomous (or partly autonomous). Accordingly, throughout the instant disclosure, references to a "transportation provider" (or "provider") may, where appropriate, refer to an operator of a human driven vehicle, an autonomous vehicle control system, an autonomous vehicle, an owner of an autonomous vehicle, an operator of an autonomous vehicle, an attendant of an autonomous vehicle, a vehicle piloted by a requestor, and/or an autonomous system for piloting a vehicle. While FIG. 12 does not specify the number of vehicles 1220, it may be readily appreciated that the systems described herein are applicable to hundreds of vehicles, thousands of vehicles, or more. In one example, dynamic transportation matching system 1210 may coordinate transportation matchings within a single region for 50,000 vehicles or more on a given day. In some examples, vehicles 1220 may collectively form a dynamic transportation network that may provide transportation supply on an on-demand basis to transportation requestors.

As mentioned above, dynamic transportation matching system 1210 may communicate with computing devices in each of vehicles 1220. The computing devices may be any suitable type of computing device. In some examples, one or more of the computing devices may be integrated into the respective vehicles 1220. In some examples, one or more of the computing devices may be mobile devices. For example, one or more of the computing devices may be smartphones. Additionally, or alternatively, one or more of the computing devices may be tablet computers, personal digital assistants, or any other type or form of mobile computing device. According to some examples, one or more of the computing devices may include wearable computing devices (e.g., a driver-wearable computing device), such as smart glasses, smart watches, etc. In some examples, one or more of the computing devices may be devices suitable for temporarily mounting in a vehicle (e.g., for use by a requestor and/or provider for a transportation matching application, a navigation application, and/or any other application suited for the use of requestors and/or providers). Additionally, or alternatively, one or more of the computing devices may be devices suitable for installing in a vehicle and/or may be a vehicle's computer that has a transportation management system application installed on the computer in order to provide transportation services to transportation requestors and/or communicate with dynamic transportation matching system 1210.

As shown in FIG. 12, vehicles 1220 may include provider devices 1230(1)-(*n*) (e.g., whether integrated into the vehicle, permanently affixed to the vehicle, temporarily affixed to the vehicle, worn by a driver of the vehicle, etc.). In some examples, provider devices 1230(1)-(*n*) may include a respective provider app 1240(1)-(*k*). Provider apps 1240(1)-(*k*) may represent any application, program, and/or module that may provide one or more services related to operating a vehicle and/or providing transportation matching services. For example, provider apps 1240(1)-(*k*) may include a transportation matching application for providers and/or one or more applications for matching personal mobility vehicles (PMVs) with requestor devices. In some embodiments, different types of provider vehicles may be provisioned with different types of provider devices and/or different provider applications. For example, PMVs may be provisioned with provider devices that are configured with a provider application that enables transportation requestors to reserve and/or operate the PMV while road-constrained vehicles (e.g., cars) may be provisioned with provider devices that are configured with a provider application that enables provider vehicle operators (e.g., transportation providers) to respond to requests from transportation requestors. In some examples, provider applications 1240(1)-(*k*) may match the user of provider apps 1240(1)-(*k*) (e.g., a transportation provider) with transportation requestors through communication with dynamic transportation matching system 1210. In addition, and as is described in greater detail below, provider apps 1240(1)-(*k*) may provide dynamic transportation matching system 1210 with information about a provider (including, e.g., the current location of the provider and/or vehicle) to enable dynamic transportation matching system 1210 to provide dynamic transportation matching and/or management services for the provider and one or more requestors. In some examples, provider apps 1240(1)-(*k*) may coordinate communications and/or a payment between a requestor and a provider. According to some embodiments, provider apps 1240(1)-(*k*) may provide a map service, a navigation service, a traffic notification service, and/or a geolocation service.

Additionally, as shown in FIG. 12, dynamic transportation matching system 1210 may communicate with requestor devices 1250(1)-(*m*). In some examples, requestor devices 1250(1)-(*m*) may include a requestor app 1260. Requestor app 1260 may represent any application, program, and/or module that may provide one or more services related to requesting transportation matching services. For example, requestor app 1260 may include a transportation matching application for requestors. In some examples, requestor app 1260 may match the user of requestor app 1260 (e.g., a transportation requestor) with transportation providers through communication with dynamic transportation matching system 1210. In addition, and as is described in greater detail below, requestor app 1260 may provide dynamic transportation matching system 1210 with information about a requestor (including, e.g., the current location of the requestor) to enable dynamic transportation matching system 1210 to provide dynamic transportation matching services for the requestor and one or more providers. In some examples, requestor app 1260 may coordinate communications and/or a payment between a requestor and a provider. According to some embodiments, requestor app 1260 may provide a map service, a navigation service, a traffic notification service, and/or a geolocation service.

Embodiments of the instant disclosure may include or be implemented in conjunction with a dynamic transportation matching system. A transportation matching system may arrange transportation on an on-demand and/or ad-hoc basis by, e.g., matching one or more transportation requestors with one or more transportation providers. For example, a transportation matching system may provide one or more transportation matching services for a networked transportation service, a ride sourcing service, a taxicab service, a car-booking service, an autonomous vehicle service, a personal mobility vehicle service, or some combination and/or derivative thereof. The transportation matching system may include and/or interface with any of a variety of subsystems that may implement, support, and/or improve a transportation matching service. For example, the transportation matching system may include a matching system (e.g., that matches requestors to ride opportunities and/or that arranges for requestors and/or providers to meet), a mapping system, a navigation system (e.g., to help a provider reach a requestor, to help a requestor reach a provider, and/or to help a provider reach a destination), a reputation system (e.g., to rate and/or gauge the trustworthiness of a requestor and/or a provider), a payment system, and/or an autonomous or semi-autonomous driving system. The transportation matching system may be implemented on various platforms, including a requestor-owned mobile device, a computing system installed in a vehicle, a requestor-owned mobile device, a server computer system, or any other hardware platform capable of providing transportation matching services to one or more requestors and/or providers.

While various examples provided herein relate to transportation, embodiments of the instant disclosure may include or be implemented in conjunction with a dynamic matching system applied to one or more services instead of and/or in addition to transportation services. For example, embodiments described herein may be used to match service providers with service requestors for any service.

Figure 13:
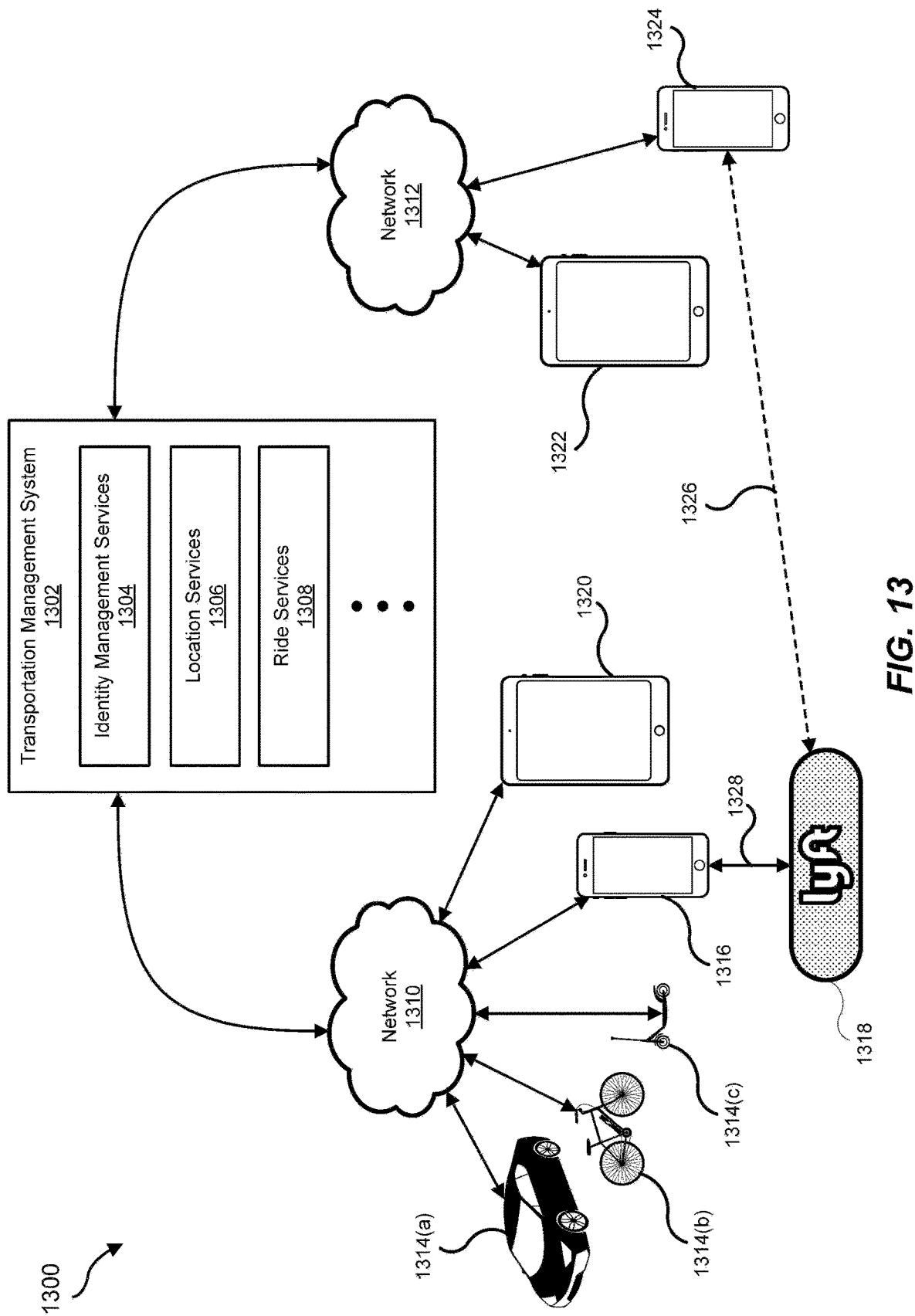
FIG. 13 shows a transportation management environment in accordance with various embodiments.

FIG. 13 shows a transportation management environment 1300, in accordance with various embodiments. As shown in FIG. 13, a transportation management system 1302 may run one or more services and/or software applications, including identity management services 1304, location services 1306, ride services 1308, and/or other services. Although FIG. 13 shows a certain number of services provided by transportation management system 1302, more or fewer services may be provided in various implementations. In addition, although FIG. 13 shows these services as being provided by transportation management system 1302, all or a portion of any of the services may be processed in a distributed fashion. For example, computations associated with a service task may be performed by a combination of transportation management system 1302 (including any number of servers, databases, etc.), one or more devices associated with a provider (e.g., devices integrated with managed vehicles 1314(*a*), 1314(*b*), and/or 1314(*c*); provider computing devices 1316 and tablets 1320; and transportation management vehicle devices 1318), and/or more or more devices associated with a ride requestor (e.g., the requestor's computing devices 1324 and tablets 1322). In some embodiments, transportation management system 1302 may include one or more general purpose computers, server computers, clustered computing systems, cloud-based computing systems, and/or any other computing systems or arrangements of computing systems. Transportation management system 1302 may be configured to run any or all of the services and/or software components described herein. In some embodiments, the transportation management system 1302 may include an appropriate operating system and/or various server applications, such as web servers capable of handling hypertext transport protocol (HTTP) requests, file transfer protocol (FTP) servers, database servers, etc.

In some embodiments, identity management services 1304 may be configured to perform authorization services for requestors and providers and/or manage their interactions and/or data with transportation management system 1302. This may include, e.g., authenticating the identity of providers and determining that they are authorized to provide services through transportation management system 1302. Similarly, requestors' identities may be authenticated to determine whether they are authorized to receive the requested services through transportation management system 1302. Identity management services 1304 may also manage and/or control access to provider and/or requestor data maintained by transportation management system 1302, such as driving and/or ride histories, vehicle data, personal data, preferences, usage patterns as a ride provider and/or as a ride requestor, profile pictures, linked third-party accounts (e.g., credentials for music and/or entertainment services, social-networking systems, calendar systems, task-management systems, etc.) and any other associated information. Transportation management system 1302 may also manage and/or control access to provider and/or requestor data stored with and/or obtained from third-party systems. For example, a requester or provider may grant transportation management system 1302 access to a third-party email, calendar, or task management system (e.g., via the user's credentials). As another example, a requestor or provider may grant, through a mobile device (e.g., 1316, 1320, 1322, or 1324), a transportation application associated with transportation management system 1302 access to data provided by other applications installed on the mobile device. In some examples, such data may be processed on the client and/or uploaded to transportation management system 1302 for processing.

In some embodiments, transportation management system 1302 may provide ride services 1308, which may include ride matching and/or management services to connect a requestor to a provider. For example, after identity management services module 1304 has authenticated the identity a ride requestor, ride services module 1308 may attempt to match the requestor with one or more ride providers. In some embodiments, ride services module 1308 may identify an appropriate provider using location data obtained from location services module 1306. Ride services module 1308 may use the location data to identify providers who are geographically close to the requestor (e.g., within a certain threshold distance or travel time) and/or who are otherwise a good match with the requestor. Ride services module 1308 may implement matching algorithms that score providers based on, e.g., preferences of providers and requestors; vehicle features, amenities, condition, and/or status; providers' preferred general travel direction and/or route, range of travel, and/or availability; requestors' origination and destination locations, time constraints, and/or vehicle feature needs; and any other pertinent information for matching requestors with providers. In some embodiments, ride services module 1308 may use rule-based algorithms and/or machine-learning models for matching requestors and providers.

Transportation management system 1302 may communicatively connect to various devices through networks 1310 and/or 1312. Networks 1310 and 1312 may include any combination of interconnected networks configured to send and/or receive data communications using various communication protocols and transmission technologies. In some embodiments, networks 1310 and/or 1312 may include local area networks (LANs), wide-area networks (WANs), and/or the Internet, and may support communication protocols such as transmission control protocol/Internet protocol (TCP/IP), Internet packet exchange (IPX), systems network architecture (SNA), and/or any other suitable network protocols. In some embodiments, data may be transmitted through networks 1310 and/or 1312 using a mobile network (such as a mobile telephone network, cellular network, satellite network, or other mobile network), a public switched telephone network (PSTN), wired communication protocols (e.g., Universal Serial Bus (USB), Controller Area Network (CAN)), and/or wireless communication protocols (e.g., wireless LAN (WLAN) technologies implementing the IEEE 902.12 family of standards, Bluetooth, Bluetooth Low Energy, Bluetooth 5, Near Field Communication (NFC), Z-Wave, and ZigBee). In various embodiments, networks 1310 and/or 1312 may include any combination of networks described herein or any other type of network capable of facilitating communication across networks 1310 and/or 1312.

In some embodiments, transportation management vehicle device 1318 may include a provider communication device configured to communicate with users, such as drivers, passengers, pedestrians, and/or other users. In some embodiments, transportation management vehicle device 1318 may communicate directly with transportation management system 1302 or through another provider computing device, such as provider computing device 1316. In some embodiments, a requestor computing device (e.g., device 1324) may communicate via a connection 1326 directly with transportation management vehicle device 1318 via a communication channel and/or connection, such as a peer-to-peer connection, Bluetooth connection, NFC connection, ad hoc wireless network, and/or any other communication channel or connection. Although FIG. 13 shows particular devices communicating with transportation management system 1302 over networks 1310 and 1312, in various embodiments, transportation management system 1302 may expose an interface, such as an application programming interface (API) or service provider interface (SPI) to enable various third parties which may serve as an intermediary between end users and transportation management system 1302.

In some embodiments, devices within a vehicle may be interconnected. For example, any combination of the following may be communicatively connected: vehicle 1314, provider computing device 1316, provider tablet 1320, transportation management vehicle device 1318, requestor computing device 1324, requestor tablet 1322, and any other device (e.g., smart watch, smart tags, etc.). For example, transportation management vehicle device 1318 may be communicatively connected to provider computing device 1316 and/or requestor computing device 1324. Transportation management vehicle device 1318 may establish communicative connections, such as connections 1326 and 1328, to those devices via any suitable communication technology, including, e.g., WLAN technologies implementing the IEEE 902.12 family of standards, Bluetooth, Bluetooth Low Energy, Bluetooth 5, NFC, Z-Wave, ZigBee, and any other suitable short-range wireless communication technology.

In some embodiments, users may utilize and interface with one or more services provided by the transportation management system 1302 using applications executing on their respective computing devices (e.g., 1316, 1318, 1320, and/or a computing device integrated within vehicle 1314), which may include mobile devices (e.g., an iPhone®, an iPad®, mobile telephone, tablet computer, a personal digital assistant (PDA)), laptops, wearable devices (e.g., smart watch, smart glasses, head mounted displays, etc.), thin client devices, gaming consoles, and any other computing devices. In some embodiments, vehicle 1314 may include a vehicle-integrated computing device, such as a vehicle navigation system, or other computing device integrated with the vehicle itself, such as the management system of an autonomous vehicle. The computing device may run on any suitable operating systems, such as Android®, iOS®, macOS®, Windows, Linux, UNIX®, or UNIX®-based or Linux-based operating systems, or other operating systems. The computing device may further be configured to send and receive data over the Internet, short message service (SMS), email, and various other messaging applications and/or communication protocols. In some embodiments, one or more software applications may be installed on the computing device of a provider or requestor, including an application associated with transportation management system 1302. The transportation application may, for example, be distributed by an entity associated with the transportation management system via any distribution channel, such as an online source from which applications may be downloaded. Additional third-party applications unassociated with the transportation management system may also be installed on the computing device. In some embodiments, the transportation application may communicate or share data and resources with one or more of the installed third-party applications.

Figure 14:
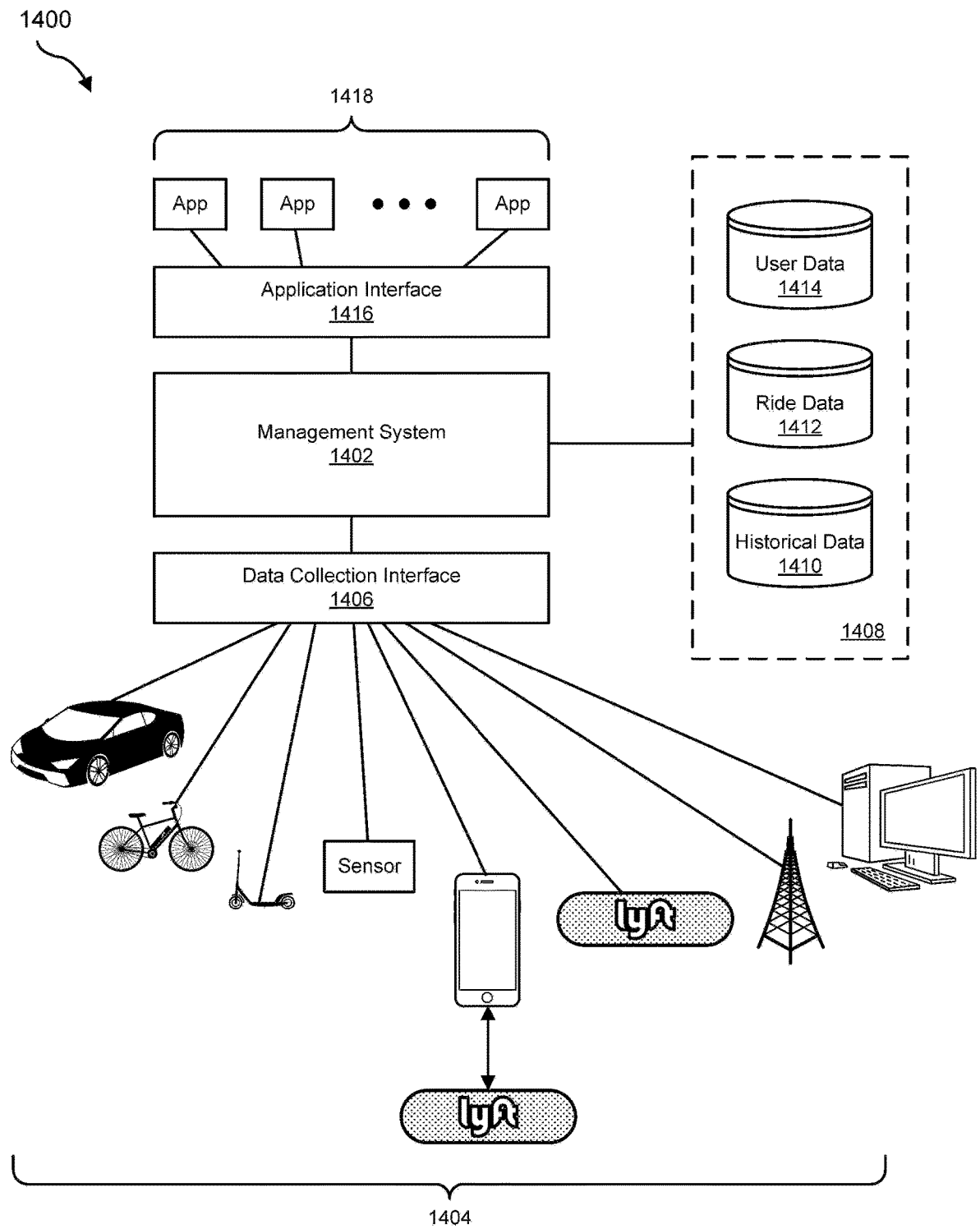
FIG. 14 shows a data collection and application management environment in accordance with various embodiments.

FIG. 14 shows a data collection and application management environment 1400, in accordance with various embodiments. As shown in FIG. 14, management system 1402 may be configured to collect data from various data collection devices 1404 through a data collection interface 1406. As discussed above, management system 1402 may include one or more computers and/or servers or any combination thereof. Data collection devices 1404 may include, but are not limited to, user devices (including provider and requestor computing devices, such as those discussed above), provider communication devices, laptop or desktop computers, vehicle data (e.g., from sensors integrated into or otherwise connected to vehicles), ground-based or satellite-based sources (e.g., location data, traffic data, weather data, etc.), or other sensor data (e.g., roadway embedded sensors, traffic sensors, etc.). Data collection interface 1406 can include, e.g., an extensible device framework configured to support interfaces for each data collection device. In various embodiments, data collection interface 1406 may be extended to support new data collection devices as they are released and/or to update existing interfaces to support changes to existing data collection devices. In various embodiments, data collection devices may communicate with data collection interface 1406 over one or more networks. The networks may include any network or communication protocol as would be recognized by one of ordinary skill in the art, including those networks discussed above.

As shown in FIG. 14, data received from data collection devices 1404 can be stored in data store 1408. Data store 1408 may include one or more data stores, such as databases, object storage systems and services, cloud-based storage services, and other data stores. For example, various data stores may be implemented on a non-transitory storage medium accessible to management system 1402, such as historical data store 1410, ride data store 1412, and user data store 1414. Data stores 1408 can be local to management system 1402, or remote and accessible over a network, such as those networks discussed above or a storage-area network or other networked storage system. In various embodiments, historical data 1410 may include historical traffic data, weather data, request data, road condition data, or any other data for a given region or regions received from various data collection devices. Ride data store 1412 may include route data, request data, timing data, and other ride related data, in aggregate and/or by requestor or provider. User data 1414 may include user account data, preferences, location history, and other user-specific data. Although certain data stores are shown by way of example, any data collected and/or stored according to the various embodiments described herein may be stored in data stores 1408.

As shown in FIG. 14, an application interface 1416 can be provided by management system 1402 to enable various apps 1418 to access data and/or services available through management system 1402. Apps 1418 may run on various user devices (including provider and requestor computing devices, such as those discussed above) and/or may include cloud-based or other distributed apps configured to run across various devices (e.g., computers, servers, or combinations thereof). Apps 1418 may include, e.g., aggregation and/or reporting apps which may utilize data 1408 to provide various services (e.g., third-party ride request and management apps). In various embodiments, application interface 1416 can include an API and/or SPI enabling third party development of apps 1418. In some embodiments, application interface 1416 may include a web interface, enabling web-based access to data 1408 and/or services provided by management system 1402. In various embodiments, apps 1418 may run on devices configured to communicate with application interface 1416 over one or more networks. The networks may include any network or communication protocol as would be recognized by one of ordinary skill in the art, including those networks discussed above, in accordance with an embodiment of the present disclosure.

While various embodiments of the present disclosure are described in terms of a networked transportation system in which the ride providers are human drivers operating their own vehicles, in other embodiments, the techniques described herein may also be used in environments in which ride requests are fulfilled using autonomous or semi-autonomous vehicles. For example, a transportation management system of a networked transportation service may facilitate the fulfillment of ride requests using both human drivers and autonomous vehicles. Additionally, or alternatively, without limitation to transportation services, a matching system for any service may facilitate the fulfillment of requests using both human drivers and autonomous vehicles.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. Additionally, or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A dynamic transportation matching system, comprising:
   a non-transitory memory; and
   one or more processors coupled to the non-transitory memory and configured to read instructions from the non-transitory memory to cause the dynamic transportation matching system to perform operations comprising:
      determining a current location of an electrically-assisted personal mobility vehicle via a wireless communication established between the dynamic transportation matching system and the electrically-assisted personal mobility vehicle;
      receiving, via the established wireless communication, a readout of a voltage value from a battery pack computing device on the electrically-assisted personal mobility vehicle, wherein the battery pack computing device is electrically coupled to a battery of the electrically-assisted personal mobility vehicle and configured to generate the readout of the voltage value;
      calculating, at the dynamic transportation matching system, an amount of charge of the battery based on the generated readout of the voltage value, wherein the calculated amount of charge of the battery comprises an estimated percentage of the charge remaining on the battery; and
      in response to determining that the calculated amount of charge of the battery satisfies a threshold, disallowing a reservation of the electrically-assisted personal mobility vehicle for a trip until a maintenance service of the battery is completed.

2. The dynamic transportation matching system of claim 1, wherein the operations further comprise:
determining that a service technician device is within a predetermined proximity to the current location of the electrically-assisted personal mobility vehicle; and
determining a time estimate to travel from a current location of the service technician device to the current location of the electrically-assisted personal mobility vehicle.

3. The dynamic transportation matching system of claim 1, wherein the operations further comprise determining a value score for performing the maintenance service of the battery.

4. The dynamic transportation matching system of claim 1, wherein the maintenance service comprises a replacement of the battery or a charging of the battery.

5. The dynamic transportation matching system of claim 1, wherein the operations further comprise:
in response to a completion of the maintenance service of the battery, allowing a reservation of the electrically-assisted personal mobility vehicle for a trip.

6. The dynamic transportation matching system of claim 5, wherein the operations further comprise:
receiving a notification from a service technician device that the maintenance service is complete; and
recording the completion of the maintenance service in a personal mobility vehicle database.

7. The dynamic transportation matching system of claim 1, wherein the current location of the electrically-assisted personal mobility vehicle is in a dock of a station, and wherein the operations further comprise:
in response to determining that the amount of charge of the battery satisfies the threshold, sending instructions to the station to disable a dispenser of the station corresponding to the dock so as to physically lock the electrically-assisted personal mobility vehicle into the dock.

8. The method of claim 1, wherein calculating, at the dynamic transportation matching system, the amount of charge of the battery further comprises:
accessing, by the dynamic transportation matching system, a previous amount of charge of the battery stored in a database, the previous amount of charge of the battery being a percentage remaining battery charge for the battery; and
determining, by the dynamic transportation matching system, a total expected riding time for the electrically-assisted personal mobility vehicle.

9. The method of claim 8, wherein calculating, at the dynamic transportation matching system, the amount of charge of the battery further comprises:
determining, by the dynamic transportation matching system, a time duration of a most recent trip completed by the electrically-assisted personal mobility vehicle;
determining, by the dynamic transportation matching system, a percentage of battery usage for the most recent trip by dividing the time duration of the most recent trip by the total expected riding time; and
subtracting, by the dynamic transportation matching system, the percentage of battery usage for the most recent trip from the previous amount of charge of the battery.

10. The dynamic transportation matching system of claim 1, wherein the electrically-assisted personal mobility vehicle may comprises an electric bicycle (e-bike) or an electric scooter (e-scooter).

11. A method, by a dynamic transportation matching system, comprising:
determining a current location of an electrically-assisted personal mobility vehicle via a wireless communication established between the dynamic transportation matching system and the electrically-assisted personal mobility vehicle;
receiving, via the established wireless communication, a readout of a voltage value from a battery pack computing device on the electrically-assisted personal mobility vehicle, wherein the battery pack computing device is electrically coupled to a battery of the electrically-assisted personal mobility vehicle and configured to generate the readout of the voltage value;
calculating, at the dynamic transportation matching system, an amount of charge of the battery based on the generated readout of the voltage value, wherein the calculated amount of charge of the battery comprises an estimated percentage of the charge remaining on the battery; and
in response to determining that the calculated amount of charge of the battery satisfies a threshold, disallowing a reservation of the electrically-assisted personal mobility vehicle for a trip until a maintenance service of the battery is completed.

12. The method of claim 11, further comprising:
determining a time estimate to travel from a current location of a service technician to the current location of the electrically-assisted personal mobility vehicle.

13. The method of claim 11, further comprising:
determining a value score for performing the maintenance service of the battery.

14. The method of claim 11, wherein the maintenance service comprises a replacement of the battery or a charging of the battery.

15. The method of claim 11, further comprising:
in response to a completion of the maintenance service of the battery, allowing a reservation of the electrically-assisted personal mobility vehicle for a trip.

16. The method of claim 15, further comprising:
receiving a notification from a mobile computing device associated with a service technician, the notification indicating that the maintenance service is complete; and
recording the completion of the maintenance service in a personal mobility vehicle database.

17. The method of claim 11, wherein the current location of the electrically-assisted personal mobility vehicle is in a dock of a station, the method further comprising:
in response to determining that the amount of charge of the battery satisfies the threshold, disabling a dispenser of the station corresponding to the dock so as to physically lock the electrically-assisted personal mobility vehicle into the dock.

18. A non-transitory machine-readable medium having stored thereon machine-readable instructions that, when executed by one or more processors of a dynamic transportation matching system, cause the dynamic transportation matching system to perform operations comprising:
determining a current location of an electrically-assisted personal mobility vehicle via a wireless communication established between the dynamic transportation matching system and the personal mobility vehicle;

receiving, via the established wireless communication, a readout of a voltage value from a battery pack computing device on the electrically-assisted personal mobility vehicle, wherein the battery pack computing device is electrically coupled to a battery of the electrically-assisted personal mobility vehicle and configured to generate the readout of the voltage value;

calculating, at the dynamic transportation matching system, an amount of charge of the battery based on the generated readout of the voltage value, wherein the calculated amount of charge of the battery comprises an estimated percentage of the charge remaining on the battery; and in response to determining that the calculated amount of charge of the battery satisfies a threshold, disallowing a reservation of the electrically-assisted personal mobility vehicle for a trip until a maintenance service of the battery is completed.

19. The non-transitory machine-readable medium of claim 18, wherein the operations further comprise:

determining that a service technician device is within a predetermined proximity to the current location of the electrically-assisted personal mobility vehicle; and determining a time estimate to travel from a current location of the service technician device to the current location of the electrically-assisted personal mobility vehicle.

20. The non-transitory machine-readable medium of claim 18, wherein the amount of charge of the battery indicates that the battery requires the maintenance service, and wherein the operations further comprise:

determining a value score for performing the maintenance service of the battery.

\* \* \* \* \*